United States Patent [19]

Tanaka et al.

[11] Patent Number: 5,166,844
[45] Date of Patent: Nov. 24, 1992

[54] DISC DRIVE APPARATUS HAVING A MECHANISM FOR OPENING/CLOSING THE SHUTTER OF A DISC CARTRIDGE

[75] Inventors: Yoshito Tanaka, Ibaraki; Toshinori Sugiyama, Tsukuba; Yoshitane Tsuburaya, Toride, all of Japan

[73] Assignee: Hitachi Maxell, Ltd., Osaka, Japan

[21] Appl. No.: 548,568

[22] Filed: Jul. 5, 1990

[30] Foreign Application Priority Data

| Jul. 5, 1989 | [JP] | Japan | 1-171818 |
| Dec. 28, 1989 | [JP] | Japan | 1-150155 |
| Dec. 28, 1989 | [JP] | Japan | 1-338163 |
| Dec. 28, 1989 | [JP] | Japan | 1-338164 |
| Dec. 28, 1989 | [JP] | Japan | 1-338166 |

[51] Int. Cl.$^5$ .................. G11B 5/012; G11B 17/04
[52] U.S. Cl. .................. 360/99.06; 360/99.02; 360/77.02
[58] Field of Search .......... 360/99.06, 99.02, 133, 360/99.01, 99.03, 99.07, 97.01; 369/77.2, 77.1, 75.2

[56] References Cited

U.S. PATENT DOCUMENTS

| 4,736,356 | 4/1988 | Koshak | 369/77.2 |
| 4,811,137 | 3/1989 | Muto et al. | 360/99.06 |
| 4,964,005 | 10/1990 | Uzuki | 360/99.06 |
| 5,005,092 | 4/1991 | Shigenai et al. | 360/99.02 |
| 5,005,093 | 4/1991 | Inoue et al. | 360/77.2 |
| 5,025,339 | 6/1991 | Kanno et al. | 360/99.06 |

FOREIGN PATENT DOCUMENTS

| 0216442 | 4/1987 | European Pat. Off. . |
| 0219980 | 4/1987 | European Pat. Off. . |
| 0248908 | 12/1987 | European Pat. Off. . |
| 0293150 | 11/1988 | European Pat. Off. . |
| 3820801 | 2/1989 | Fed. Rep. of Germany . |

Primary Examiner—Aristotelis Psitos
Assistant Examiner—Alfonso Garcia
Attorney, Agent, or Firm—Birch, Stewart, Kolasch & Birch

[57] ABSTRACT

A disc drive apparatus including a cartridge holder for detachably holding a disc cartridge, which is provided with a shutter slidingly moving in one direction from a closed position to open windows formed in an upper surface and a lower surface of a cartridge case, has a pair of elongated opening/closing arms rotatably mounted on the cartridge holder for moving the shutter in an opening direction by an inserting force of the disc cartridge into the cartridge holder. Each proximal end of the pair of opening/closing arms are rotatably mounted at a predetermined internal on a ceiling plate forming the cartridge holder, at a disc cartridge insertion opening side, the one opening/closing arm for moving the shutter in the opening direction when the disc cartridge is inserted relative to the cartridge holder with a first surface thereof facing upwardly and the other opening/closing arm for moving the shutter in the opening direction when the disc cartridge is inserted relative to the cartridge holder with a second surface thereof facing upwardly. The pair of opening/closing arms cross each other with their distal end portions being disposed in a rearward direction of the cartridge holder. Pins provided at the distal end portions of the respective opening/closing arms for driving the shutter are disposed outside of the closed position of the shutter within the cartridge holder.

12 Claims, 24 Drawing Sheets

DISC DRIVE APPARATUS HAVING A MECHANISM FOR OPENING/CLOSING THE SHUTTER OF A DISC CARTRIDGE

BACKGROUND OF THE INVENTION

1. Field of the Invention

The present invention relates to a disc drive apparatus on which a disc cartrige receiving a double-sided recording type disc-like recording medium may be mounted in a reversible manner, and more particularly to a mechanism for opening/closing a shutter provided in a disc cartridge.

2. Description of the Prior Art

An image file system in which an optical disc (including both writable type and rewritable type) is used as a file memory has been noted because its recording density is much larger than that of other information recording medium. Thus, a variety of disc drive devices and disc cartridges suitable have been proposed for that system.

FIG. 53 is a perspective view schematically showing an example of a disc drive apparatus of this type. A cartridge holder 3 is formed into a frame shape into which a disc cartridge is insertable and has an opening 2, at its bottom, through which a turntable is inserted. Opening/closing arms 4 and 5 are pivotally provided at their ends to side portions on a disc cartridge stop side of the cartridge holder 3. Pins 4a and 5a coupled to these ends of the opening/closing arms 4 and 5 are disposed in a cartridge insertion path within the cartridge holder 3. The opening/closing arms 4 and 5 are normally biased by springs (not shown) in a direction in which the disc cartridge 6 is discharged from the cartridge holder 3. The opening/closing arms 4 and 5 are rotated inwardly (in the directions indicated by arrows A and B) by the insertion of the disc cartridge 6. When the disc cartridge 6 is discharged from the cartridge holder 3, the arms 4 and 5 are automatically returned back to the original positions.

On the other hand, in the disc cartridge 6 adapted to this optical disc drive apparatus, as shown in FIGS. 54 and 55, a window 10 for insertion of the head and the turntable are formed in a portion from a central portion to a front edge 9 of a cartridge half 8 which rotatably receives a both-sided recording type optical disc 7. A shutter 11 is slidably mounted for closing/opening the window 10 along the front edge 9. The both-sided recording type optical disc 7 is formed by bonding two optical disc elements with their recording layers facing each other.

In the front edge 9 of the disc cartridge 6, a sliding portion 12 is recessed for sliding movement of the above-described pins 4a and 5a. Further, a recessed portion 13 contiguous with the sliding portion 12 is formed so that the recessed portion 13 may come into contact with the pin 4a or 5a. Cutouts 14 are formed in sides of the disc cartridge 6 for positioning the disc relative to the cartridge holder 3. At corner portions close to rear edges 15 of the upper and lower halves 8a and 8b, erroneous proof mechanisms 16 and 17 are formed in a symmetrical manner with respect to a center line C—C of the window 10.

As shown in FIG. 54, the window 10 is closed by the shutter 11 in the non-use condition of the disc cartridge 6, i.e., the condition in which the disc cartridge 6 is not inserted into the cartridge holder 3. Thus, foreign matters may be prevented from entering through the window to protect the optical disc 7.

When the disc cartridge 6 is inserted into the cartridge holder 3, as shown in FIG. 52, one of the pins 4a is inserted into a space 18 defined by the end face of the shutter 11 and the sliding portion 12.

Under this condition, when the disc cartridge 6 is depressed, one of the arms 4 is rotated in the direction indicated by the arrow A in accordance with the depression thereof, so that the pin 4a is engaged with the end face of the shutter 11 to thereby depress the shutter 11 in an opening direction D.

At this time, the other pin 5a is not engaged with the shutter 11 but rides over the front face of the shutter 11 to slidingly move along the front face in the direction indicated by the arrow B.

When the disc cartridge 6 is inserted into the cartridge holder 3 up to a predetermined position, as shown in FIG. 55, the shutter 11 is moved by a predetermined distance in the direction D to thereby open the window 10. At this time, the pin 4a falls in the recess 13 formed in the front edge 9 to thereby position the shutter 11 at the predetermined position.

Simultaneously therewith, a sensor (not shown) provided in the cartridge holder 3 will detect the insertion of the disc cartridge 6 at the predetermined position. The cartridge holder 3 is lowered and the optical disc 7 is clamped on the turntable 1 to thereby complete the loading of the disc cartridge 6.

It should be noted that an example of a conventional cartridge is used in which a cutout 19 is formed in a front face of a shutter 11, and a pin 4a or 5a is engaged with the cutout to thereby open and close the shutter as shown in FIGS. 56A and 56B.

It is also to be noted that, since a width W of the window 10 of an optical disc cartridge is larger than that of a magnetic disc cartridge (for a floppy disc), the amount of movement of the shutter 11 for opening/closing the window 10 becomes larger.

In order to increase the amount of movement of the shutter 11, it is necessary to increase a length L of the arms 4 and 5 and to decrease an angle $\theta$ defined between a line E—E connecting the pivot 4b, 5b and the pin 4a, 5a to each other and a line F—F in conformity with the disc cartridge insertion direction (which angle will be referred to as an initial set angle).

However, if the length L of the arms 4 and 5 is increased, there is a disadvantage such that the disc drive apparatus is made large in size. On the other hand, if the initial set angle $\theta$ is decreased, a collision force generated when the front edge 9 of the disc cartridge 6 is brought into abutment with the pin 4a, 5a is increased, and at the same time, the opening/closing operation of the shutter 11 needs a large force, resulting in degradation in operational feeling.

If the initial set angle $\theta$ is increased, then it is possible to avoid or suppress the foregoing disadvantage. However, inversely, the amount of movement of the shutter 11 will become small. It is therefore difficult to apply this to the optical disc drive apparatus.

Incidentally, in the magnetic disc drive apparatus, there has been provided a structure in which the arms are mounted on an upper surface of the cartridge holder 3 to thereby miniaturize the apparatus as in, for example, Japanese Patent Unexamined Publication 59-2269. However, in this magnetic disc drive apparatus, there is no means for mounting the disc cartridge in a reversible manner. It is impossible to apply this to the optical disc drive apparatus for driving the both-sided recording type optical disc.

Turning to the apparatus for the disc shown in FIGS. 56A and 56B, since the opening/closing arms 4 and 5 must be crossed in the midway of the shutter opening/closing operation, it is difficult to increase the size of the cutout 19. As a result, the engagement between the cutout 19 and the pin 4a, 5a would be insufficient, so that the engagement therebetween is likely to be released. In particular, in a small size disc cartridge in which the size of the cutout is restricted, such a disadvantage is remarkable. It is impossible to put this system into practical use.

SUMMARY OF THE INVENTION

In order to overcome the above-noted disadvantages inherent in the prior art, a primary object of the present invention is to provide a disc drive apparatus which is small in size and excellent in operational feeling and on which an optical disc cartridge of both-sided recording type may be mounted with a positive opening/closing operation for a shutter.

In order to attain this and other objects, according to the present invention, there is provided a disc drive apparatus including a cartridge holder for detachably holding a disc cartridge provided with a shutter slidingly moving in one direction from a closed position to open windows formed in an upper surface and a lower surface of a cartridge case and opening/closing arms rotatably mounted on the cartridge holder for moving the shutter in an opening direction by an insertion force of the disc cartridge into the cartridge holder, the apparatus being characterized in that a proximal end portion of a first opening/closing arm for moving the shutter in the opening direction when the disc cartridge is inserted relative to the cartridge holder with a first surface thereof facing upwardly and a proximal end portion of a second opening/closing arm for moving the shutter in the opening direction when the disc cartridge is inserted relative to the cartridge holder with a second surface thereof facing upwardly are rotatably mounted at a predetermined interval on a disc cartridge insertion opening side of a ceiling plate forming the cartridge holder, the two opening/closing arms crossing each other with their distal end portions being disposed in a rearward direction of the cartridge holder, and pins provided at the distal end portions of the respective opening/closing arms for driving the shutter being disposed outside of the closed position of the shutter within the cartridge holder.

If the two opening/closing arms are mounted on the ceiling plate of the cartridge holder, it is unnecessary to specifically provide a set space for the opening/closing arms. Accordingly, it is possible to further reduce a planar size of the disc drive apparatus in comparison with the case where these arms are provided in the side portions of the cartridge holder.

In addition, if the two arms cross each other and their proximal end portions are rotatably mounted on the insertion opening side of the cartridge holder with their distal end portions being disposed in the rearward direction of the cartridge holder, then the initial set angle of the arms may be increased. Thus, it is possible to drive the shutter with a small force.

Furthermore, if the pins provided at the distal end portions of the opening/closing arms for driving the shutter are disposed outside of the closed position of the shutter within the cartridge holder, then the pins may be engaged with the shutter and/or a side surface of a member which is slidingly moved together with the shutter, and the two components may be engaged with each other with a sufficient engagement allowance. Accordingly, it is unlikely that the two components would be disengaged from each other during the shutter opening/closing operation.

Accordingly, it is possible to provide a disc drive apparatus which is small in size and excellent in operational feeling and on which an optical disc cartridge of both-sided recording type with a positive opening/closing operation of the shutter.

BRIEF DESCRIPTION OF THE DRAWINGS

In the accompanying drawings:

FIG. 1 is a perspective view showing a disc drive apparatus;

FIG. 2 is a plan view of the disc drive apparatus;

FIG. 3 is a side elevational view as viewed in the disc cartridge insertion direction;

FIG. 4 is a side cross-sectional view of the disc drive apparatus along center line IV—IV of FIG. 1;

FIG. 5 is a view illustrating forces applied to the arms;

FIG. 6 is a graph showing a relationship between an angle of the arm and a loading force;

FIG. 7 is a perspective view showing a first example of a shutter holding member;

FIG. 8 is a perspective view showing a second example of a shutter holding member;

FIG. 9 is a perspective view showing a third example of a shutter holding member;

FIG. 10 is a perspective view showing a fourth example of a shutter holding member;

FIG. 11 is a perspective view showing a fifth example of a shutter holding member;

FIG. 12 is a perspective view showing a sixth example of a shutter holding member;

FIGS. 13 and 14 are plan views showing the engagement position of the shutter holding member in accordance with the sixth example;

FIG. 15 is a cross-sectional view showing a seventh example of a shutter holding member;

FIG. 16 is a cross-sectional view showing a fixture portion of the seventh shutter holding member;

FIG. 17 is a frontal view of the fixture portion shown in FIG. 16;

FIG. 18 is a perspective view showing an engagement pin;

FIG. 19 is a perspective view showing an engagement pin of an eighth example of a shutter holding member;

FIG. 20 is a perspective view showing a ninth example of a shutter holding member; and FIG. 21 is a perspective view showing a tenth example of a shutter holding member;

FIGS. 22 to 31 are illustrations for a disc cartridge which is applied to the disc drive apparatus in accordance with the first embodiment;

FIG. 22 is a perspective view showing the disc cartridge;

FIG. 23 is a plan view showing a lower half;

FIG. 24 is a cross-sectional view showing the lower half;

FIG. 25 is a frontal view of the lower half;

FIG. 27 is a perspective view showing the shutter;

FIG. 28 is a side elevational view showing the shutter;

FIG. 29 is a side elevational view showing a slider;

FIG. 30 is a front view showing the slider; and

FIG. 31 is a plan view showing the slider;

FIGS. 34 to 40 are views showing a second embodiment of the invention;

FIG. 34 is a perspective view showing a disc drive apparatus;

FIG. 36 is a view showing the operation of the second embodiment;

FIG. 38 is a perspective view showing the engagement condition of the disc cartridge and the associated parts in the deepest portion of the cartridge holder;

FIG. 40 is a view showing the operation of the pin and the shutter;

FIGS. 41 and 42 are front views showing the cartridge holder of other embodiments;

FIGS. 43 and 44 are front views showing the engagement condition between the disc cartridge and the pin;

FIG. 45 is a plan view showing a slider;

FIG. 46 is a front view showing the cartridge case;

FIGS. 47 and 48 are plan views showing the engagement condition between the slider and the cartridge case;

FIG. 49 is a plan view showing the engagement condition between the disc cartridge and the arm;

FIG. 50 is a perspective view showing a cartridge holder;

FIG. 51 is a perspective view showing a shutter; and

FIG. 52 is a plan sectional view showing the positional relationship between the arms and the window;

FIGS. 53 to 56A and 56B are illustrations of the prior art;

FIG. 53 is a perspective view showing a cartridge holder;

FIGS. 54 and 55 are views showing the operation; and

FIGS. 56A and 56B are plan views showing the other disc cartridge.

DESCRIPTION OF THE PREFERRED EMBODIMENTS

Figure 52:
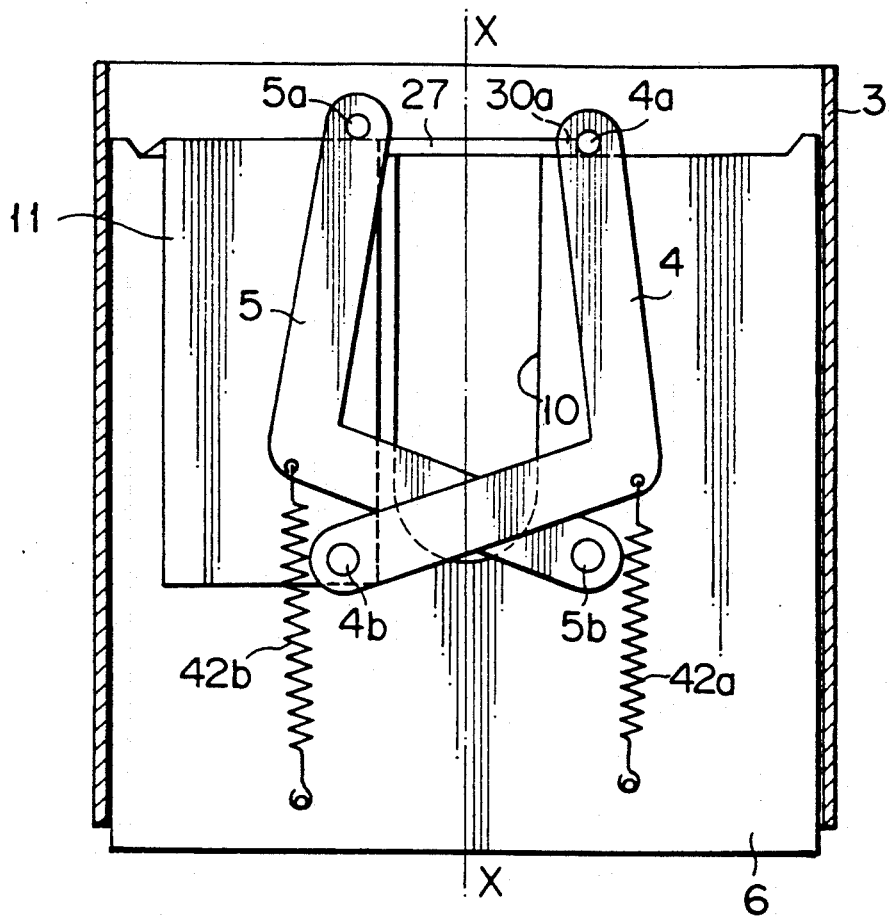
Figure 53:
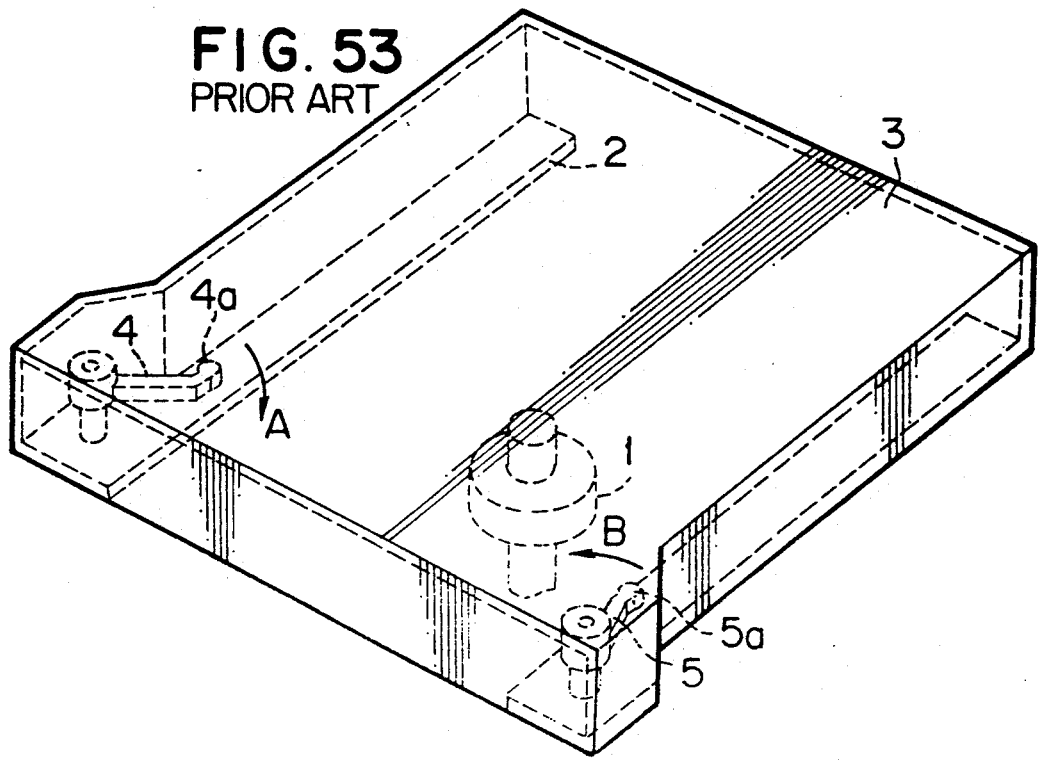
Figure 54:
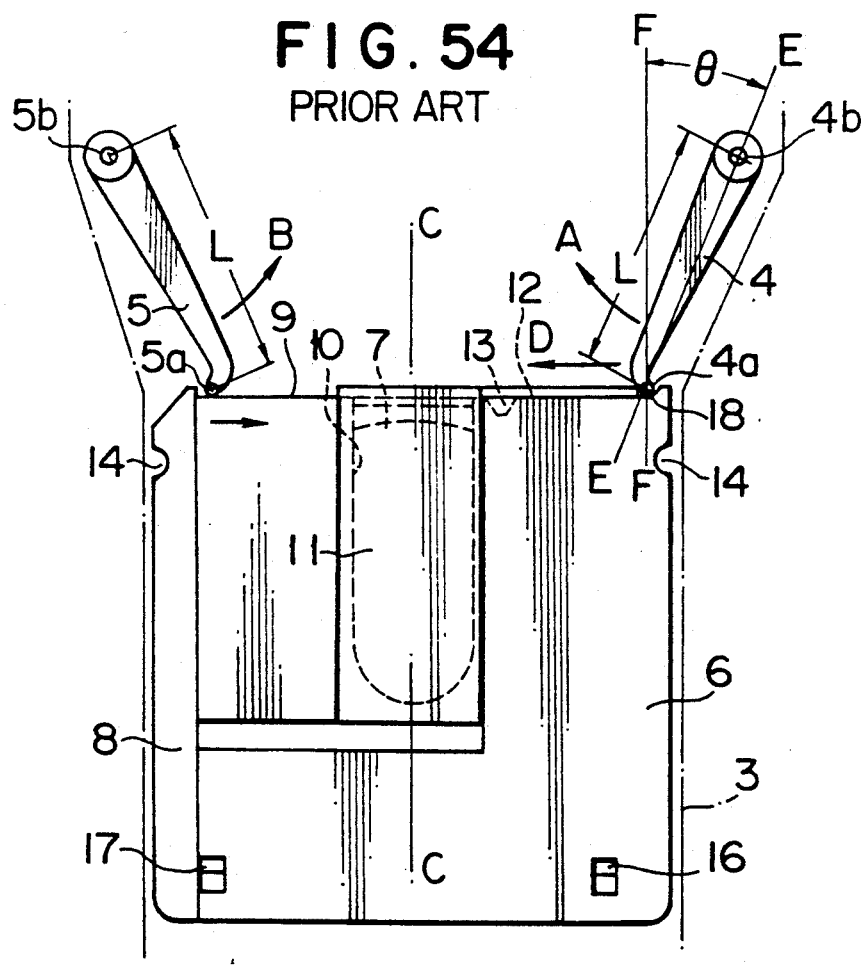
Figure 55:
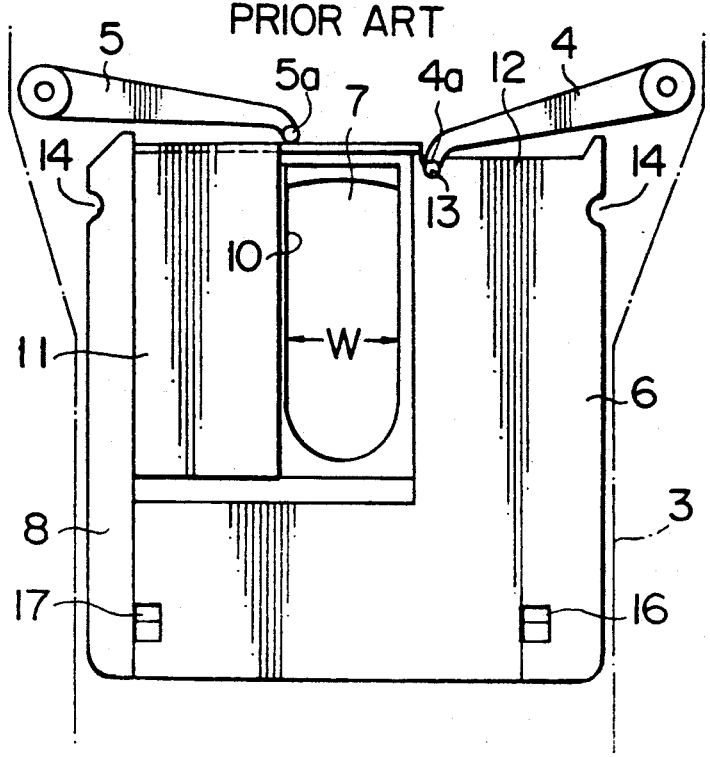
Figure 56A:
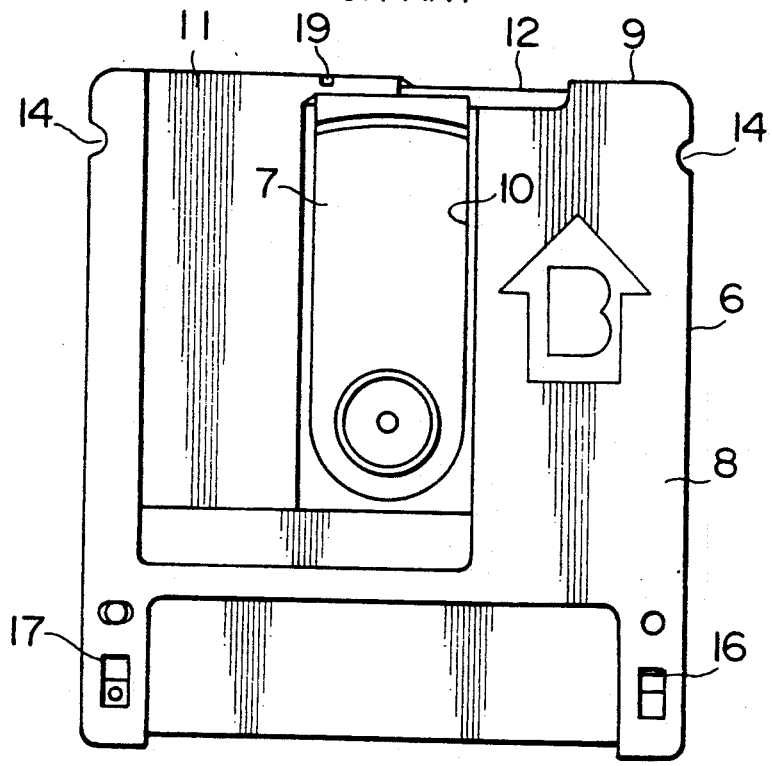
Figure 56B:
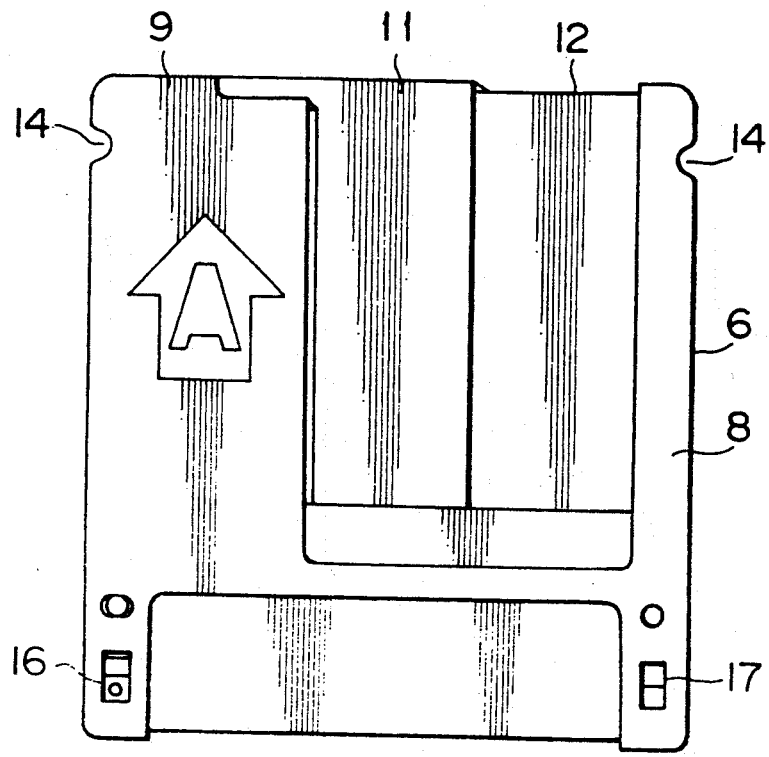

Before explaining the present invention, one example of a disc cartridge applied to a disc drive apparatus will now be explained with reference to FIGS. 22 to 31, in which the members and components shown in FIGS. 52 to 54 are designated by the same reference numerals or characters.

Figure 22:
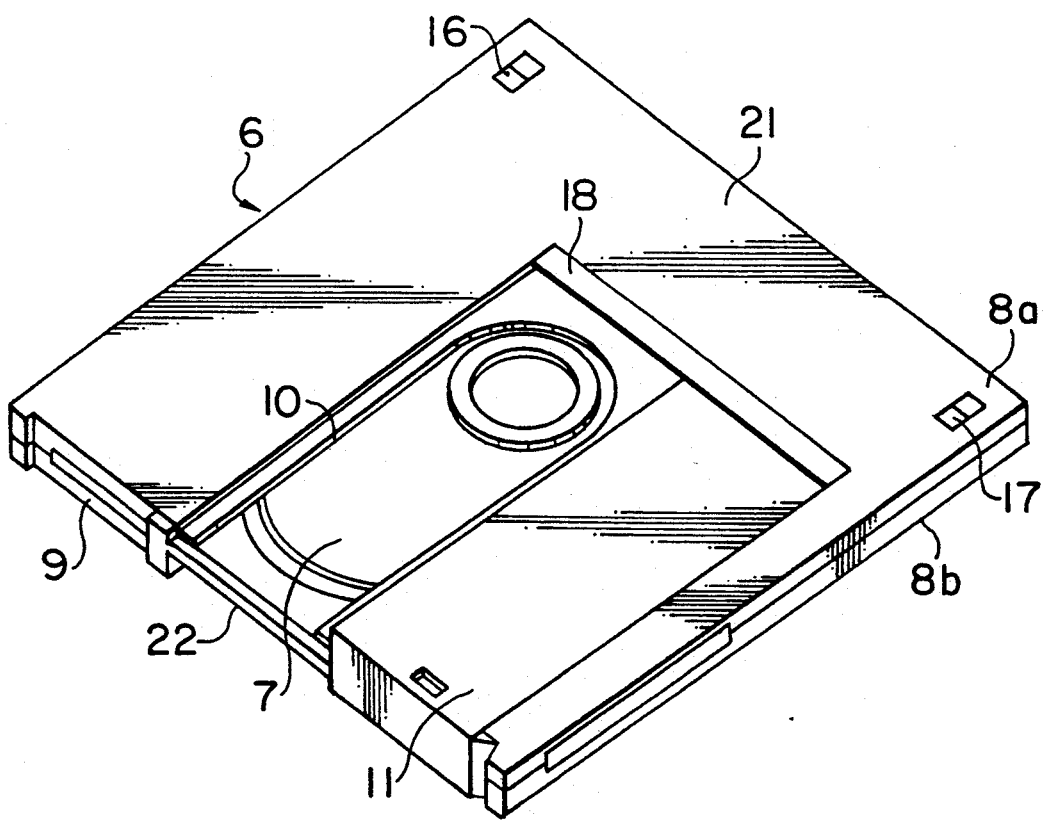

As shown in FIG. 22, the disc cartridge 6 is composed essentially of a cartridge case 21 made of hard plastic, an optical disc 7 of both-sided recording type rotatably received within the cartridge case 21, a slider 22 slidably mounted along a front edge 9 of the cartridge case 21, a shutter 11 fixed to the slider 22 for sliding in one direction from a closed position to open/close a window 10 formed in the cartridge case 21, and a shutter holding plate 18 holding the edge portion of the shutter 11.

As shown in FIG. 22, the cartridge case 21 is composed of an upper half 8a and a lower half 8b. The two halves 8a and 8b are bonded together by using a plurality of screws (not shown) to thereby define a space for receiving the optical disc 7 and the other structural members.

Figure 23:
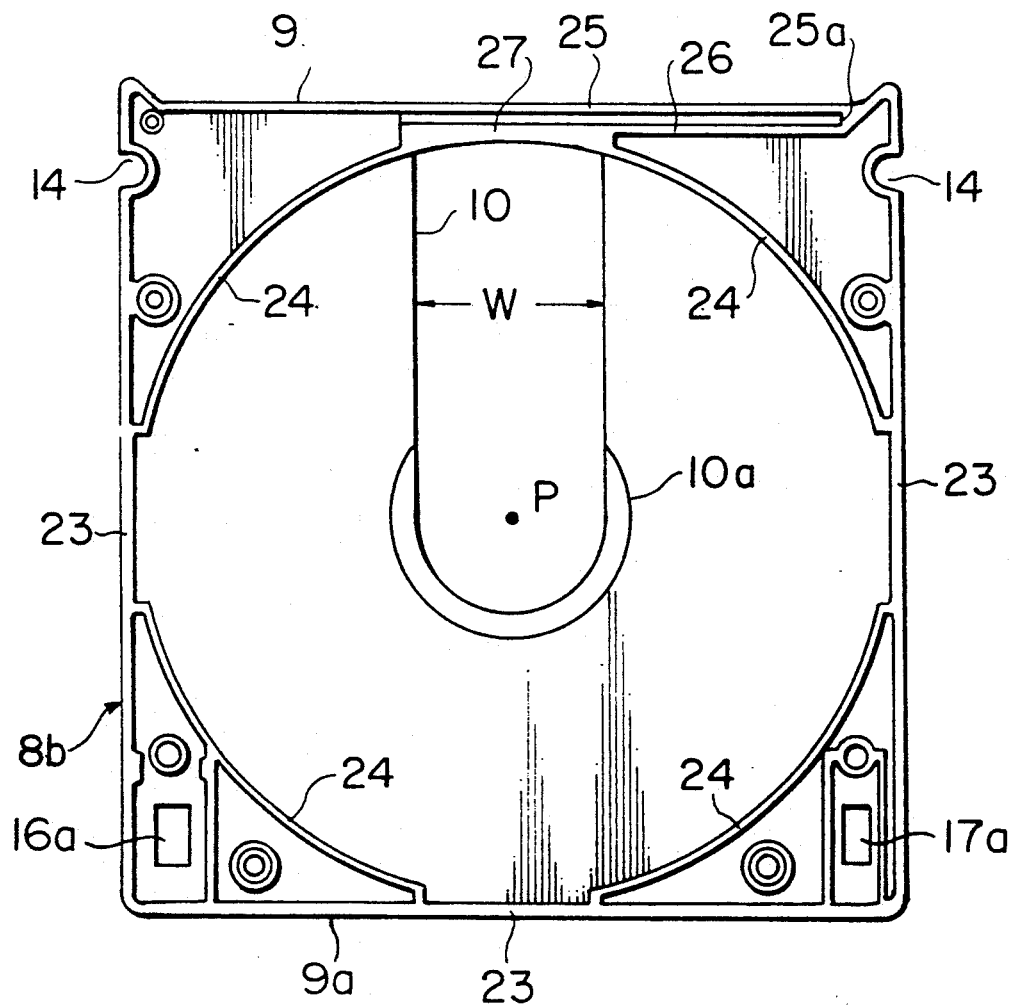

As shown in FIG. 23, in the lower half 8b, there is formed the elongated window 10 extending from a central portion corresponding to the center P of rotation of the optical disc 7 to the front edge 9 (i.e., a side edge facing the insertion side toward the disc drive apparatus). The openings 16a, 17a for an erroneous erasure preventing mechanism are symmetrically provided on the both sides in the lower half 8b near the rear end portion 9a. A width W of the window 10 is determined such that the turntable for drivingly rotating the optical disc 7 and the head for recording/reproducing informations for the optical disc may be inserted into the window 10.

Figure 24:
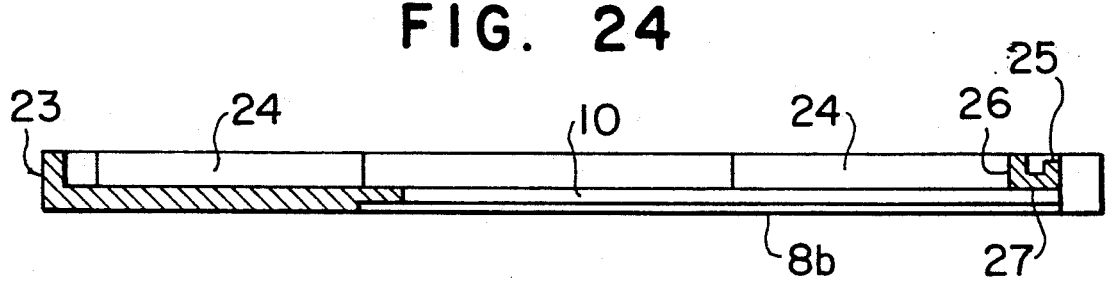

As shown in FIGS. 23 and 24, a coupling wall 23 having a constant height is formed along an outer peripheral edge other than the front edge 9 of the lower half 8b. In addition, partitioning walls 24 having the same height as that of the coupling wall 23 are formed in a ring on a circumference about the rotational center P of the optical disc 7. Thus, receiving space 24a for the optical disc 7 is formed. Further, on a circumference about the rotational center P of the window 10 is formed in a ring an annular projection 10a for a disc, having a lower height than the heights of the coupling wall 23 and the partitioning walls 24.

A guide rail 25 having a height somewhat lower than that of the coupling wall 23 and the partitioning walls 24 is linearly formed in the front edge 9 of the lower half 8b. A stepped portion 25a for stopping the shutter is formed at an end portion of the guide rail 25 on the shutter closed side. Another coupling wall 26 having the same height as that of the walls 23 and 24 is formed in parallel with the guide rail 25 inside of the guide rail 25.

Figure 25:

As shown in FIG. 25, in confronted relation to the window 10 of the front edge of the lower half 8b, a reinforcement portion 27 recessed from the surface of the lower half 8b is formed integrally to be flush with the end portion of the guide rail 25.

As shown in FIG. 25, at an outer portion of the lower half 8b where the shutter 11 is sliding moved, there is formed a recess 28 for retracting the surface of the shutter 11 within the surface of the lower half 8b.

Figure 26A:
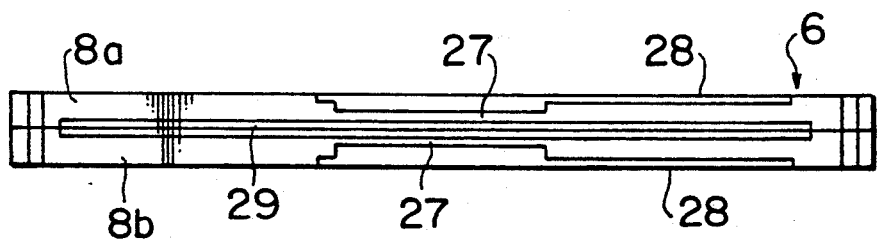
FIG. 26A is a front view showing the cartridge case.
Figure 26B:
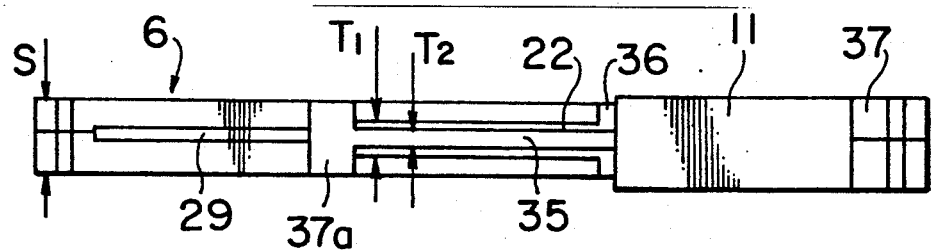
FIG. 26B is a front view showing the disc cartridge.

On the other hand, the upper half 8a is formed in the same shape as that of the lower half 8b except that the respective components of the upper half 8a are formed in symmetrical positions with those of the lower half 8b. Accordingly, if these halves 8a and 8b are coupled to each other, as shown in FIGS. 26(a) and 26(b), a slider insertion hole 29 are linearly formed in the coupling portion of the front edge 9.

A structure of the shutter 11 will now be explained.

Figure 27:
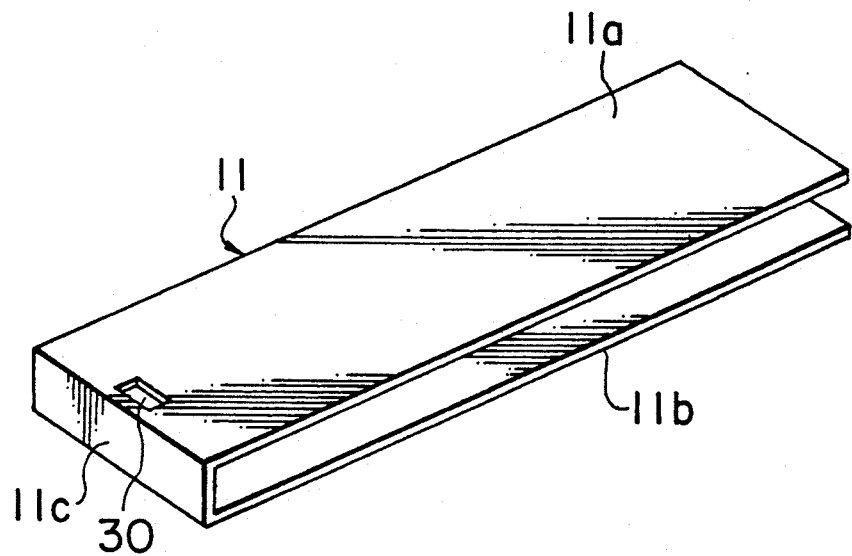
Figure 28:
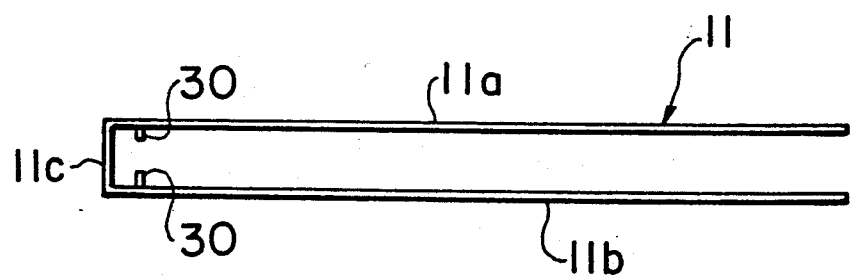

As shown in FIGS. 27 and 28, by bending a thin plate made of stainless steel or the like into a U-shape, the shutter 11 has an upper portion 11a and a lower portion 11b having such a length that the portions 11a and 11b may simultaneously cover the entire portion of the window 10, and a front portion 11c having substantially the same width as a thickness S of the shutter setting portion of the cartridge case 8. Retaining claws 30 are bendingly formed inwardly in the portions of the upper portion 11a and the lower portion 11b close to the front portion 11c.

Figure 29:
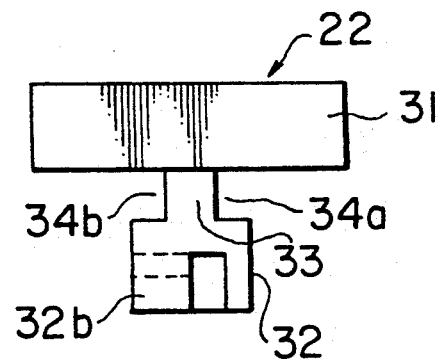

As shown in FIG. 29, the slider 22 is composed of a front face portion 31 having a large width, a rear face portion 32 having a small width, and a connecting portion 33 coupling the front and rear face portions 31 and 32 to each other. The slider 22 embraces the guide rails 25 within concave grooves 34a and 34b formed by these portions.

Figure 30:
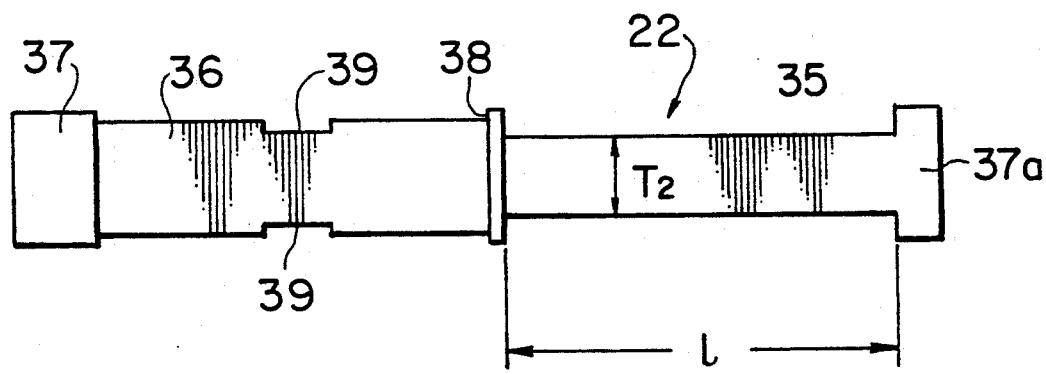
Figure 31:
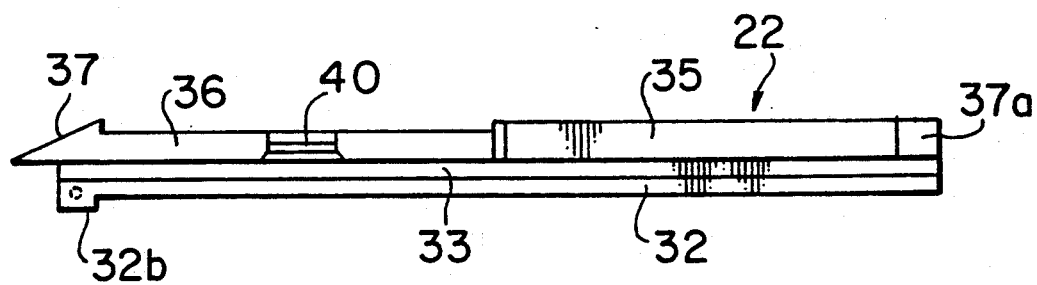

As shown in FIGS. 30 and 31, the front face portion 31 is composed of a head insertion portion 35 having a length l which is somewhat larger than the width W of the window 10 and a width $T_2$ which is equal to or narrower than a thickness $T_1$ of the reinforcement portion 27, a shutter mounting portion 36 having substantially the same width as an inner width of the shutter 11, a tapered portion 37 formed at an end portion of the shutter mounting portion 36, and a pin engagement portion 37a formed opposite the shutter mounting portion 36 through the head insertion portion 35. The pin engagement portion 37a has substantially the same thickness as that of the shutter mounting portion 36.

A recessed portion 38 for mounting the shutter 11 is formed over the front face and upper and lower surfaces of the shutter mounting portion 36. Further, recessed portions 39 are formed in the central portions of the upper and lower surfaces of the shutter mounting portion 36 for facilitating the engagement with the retainer claws 30 formed in the shutter 11 by bending. Furthermore, recessed portions 40 for receiving the retainer claws are formed in the bottoms of the recessed portions 39 for engagement with the retainer claws of the shutter mounting portion 36.

The rear face portion 32 has a constant width over its overall length as viewed from the rear side of the slider 22, and a spring retainer portion 32b projects from the end of the rear face portion 32 on the side of the tapered portion 37 as best shown in FIG. 31.

The slider 22 is integrally formed of synthetic resin which is superior in sliding property, such as nylon or polyacetal.

The shutter 11 is mounted on the slider 22 by the engagement of the retainer claws 30 with the shutter mounting portion 36. The slider 22 is slidably mounted on the cartridge case 21 with the tapered portion 37 being directed in the moving direction of the shutter 11 for opening and with the recessed grooves 34a and 34b being engaged with the rails 25.

In this case, the upper portion 11a and the lower portion 11b of the shutter 11 are laid on the upper and lower surfaces of the cartridge case 21, respectively so as to close the respective windows 10 formed in the upper and lower halves 8a and 8b. The edge portions of the shutter 11 are held in intimate contact with the cartridge case 21 by elongated shutter holding plates 18 attached to the cartridge case 21.

The stepped portion 25a for stopping the shutter 11 is formed in such a positional relation that the side portion of the shutter 11 is not contacted with the end face of the recessed portion 28 when the end face of the slider 22 is contacted with the stepped portion 25a. With such an arrangement, it is possible to reduce an amount of debris generated upon the abutment between the shutter 11 and the cartridge case 21.

Subsequently, a first embodiment of a disc drive apparatus according to the invention will now be described with reference to FIGS. 1 through 21.

Figure 1:
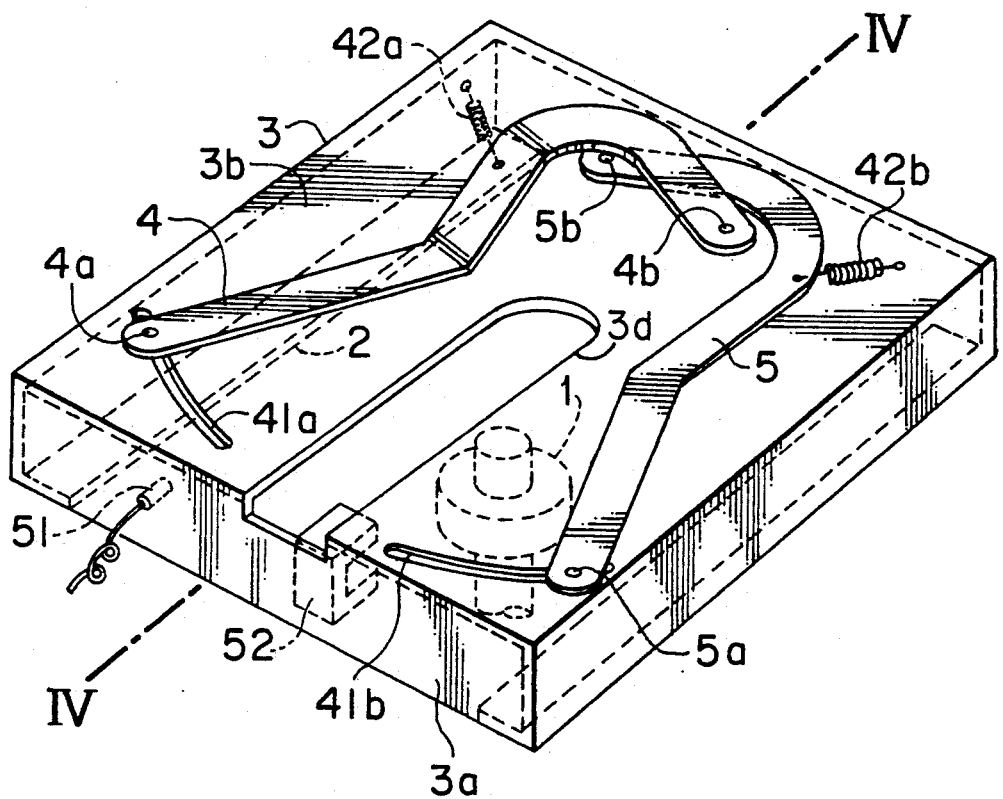
FIGS. 1 to 21 show a first embodiment of the invention.
Figure 4:
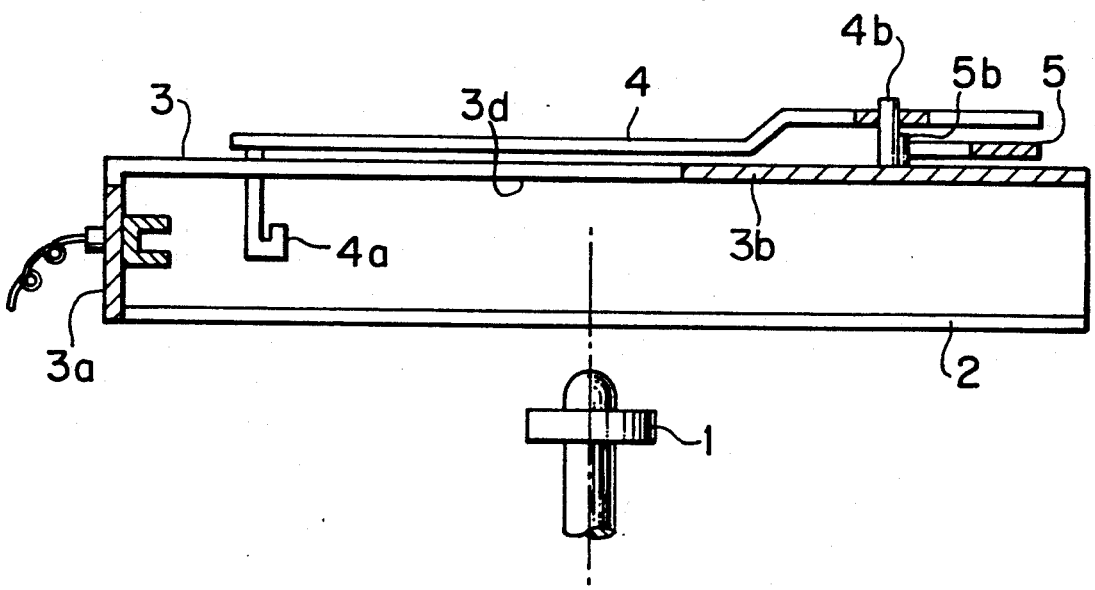
Figure 2:
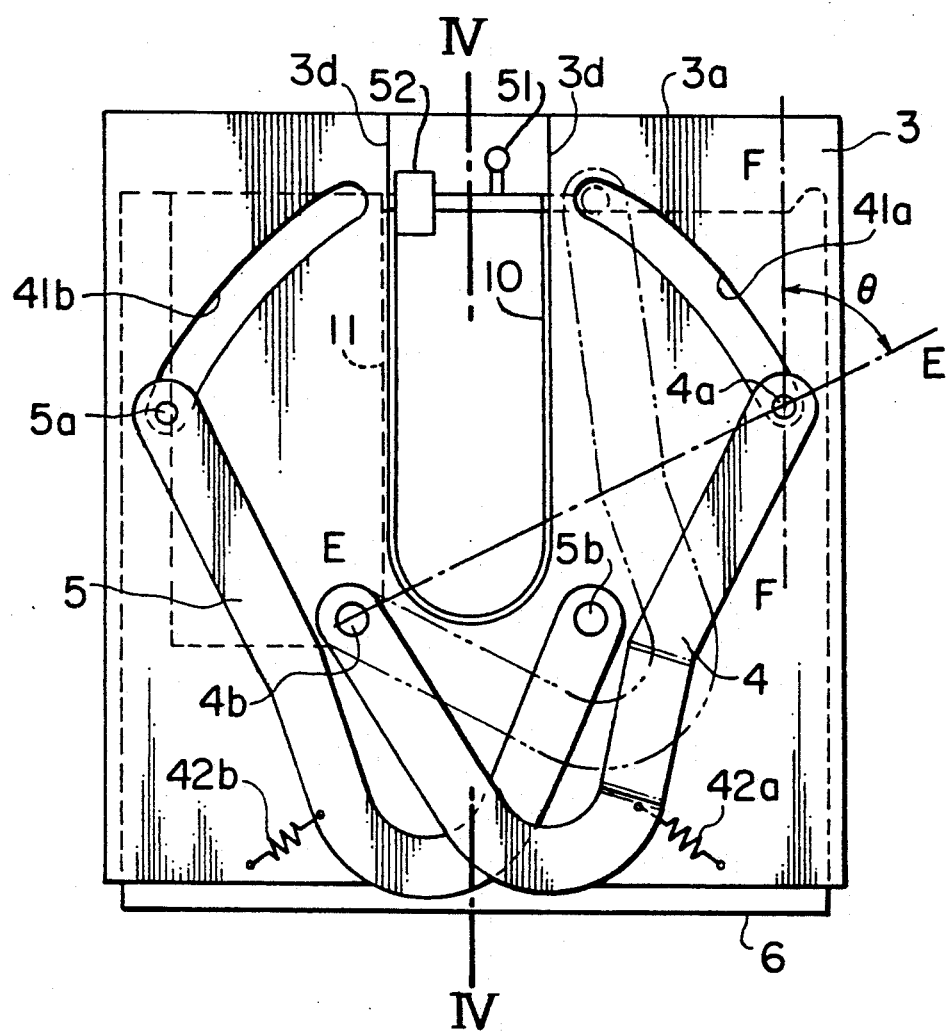
Figure 3:
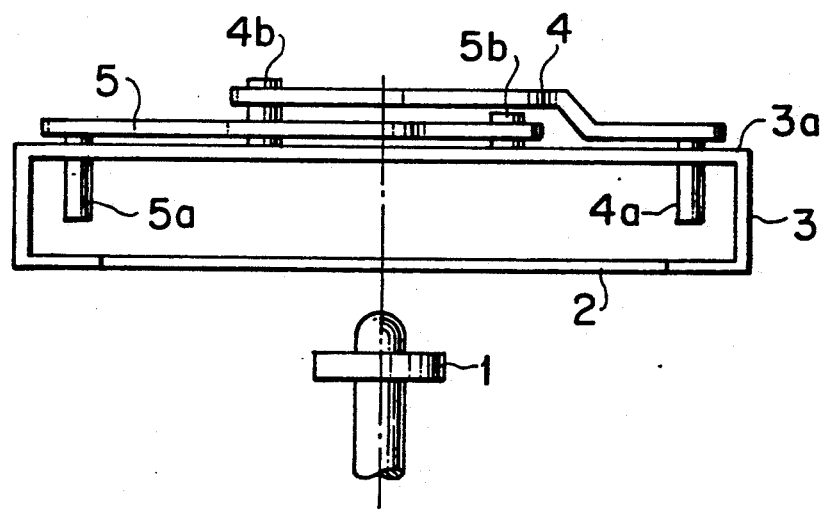

FIG. 1 is a perspective view showing a cartridge holder and its vicinity, FIG. 2 is a plan view of the cartridge holder, FIG. 3 is a side elevational view of the holder as viewed from the side surface thereof, and FIG. 4 is a cross-sectional view of the cartridge holder as viewed from the side surface thereof. In FIGS. 1 to 4, the same reference numerals or characters are used to indicate the members or components corresponding to those in FIG. 53.

As shown in FIGS. 1 to 4, two opening/closing arms 4 and 5 are mounted on an upper surface of a ceiling plate 3b of the cartridge holder 3 in the disc drive apparatus according to the invention. The ceiling plate 3b is provided with a long slot-like, head inserting opening 3d from the disc cartridge stop end 3a to a portion corresponding to the window 10 of the disc cartridge inserted to the stop end 3a.

As shown in FIGS. 1 and 2, the respective opening/closing arms 4 and 5 are arranged in combination to cross each other in a symmetrical manner with respect to a common centerline IV—IV to the head inserting opening 3d and the disc drive apparatus. Pivot shafts 4b and 5b are rotatably mounted on the insertion inlet side of the cartridge holder 3 with their end portions being arranged on the disc cartridge stop end 3a side of the cartridge holder. Therefore, the first opening/closing arm 4 having the pivot shaft 4b on the left side of the centerline IV—IV (FIG. 1) has a tip end on the right side of the centerline IV—IV, whereas the second opening/closing arm 5 having the pivot shaft 5b on the right side of the centerline IV—IV has a tip end on the left side of the centerline IV—IV.

A shape, an arrangement, an angular motion range and the like for the respective opening/closing arms 4 and 5 are selected so that, as shown by one-dotted lines in FIG. 2, the arms 4 and 5 are not positioned to close the window 10 of the disc cartridge and the head inserting opening 3d, inserted into the cartridge holder 3 even if the arms 4 and 5 are angularly moved to the innermost positions. In addition, the shape, the arrangement and the angular motion range of the arms 4 and 5 are selected so that any part of the arms 4 and 5 are not deviated from above the region of the ceiling plate 3b of the cartridge holder 3 whenever the the arms 4 and 5 are moved from a starting position to the terminal position. Furthermore, in order to avoid any interference of the opening/closing arms 4 and 5 with each other, the set positions of the arms 4 and 5 relative to the pivot shafts 4b and 5b are differentiated in level so that they cross in a three-dimensional manner as shown in FIGS. 3 and 4.

Pins 4a and 5a are mounted at the tip ends of the opening/closing arms 4 and 5, respectively. As shown in FIGS. 1 and 2, the pins 4a and 5a are arranged outside of the shutter closing position within the cartridge holder 3 through arcuate through-holes 41a and 41b formed in the ceiling plate 3b. Of course, the through-holes 41a and 41b are formed on arcuate lines about the pivot shafts 4b and 5b, respectively.

The opening/closing arms 4 and 5 are normally biased outwardly by return springs 42a and 42b. With this arrangement, during the insertion of the disc cartridge 6, one of the pins 4a is located in abutment with an outer surface of the pin engagement portion 37a of the slider 22 retained in the closed position. On the other hand, the other pin 5a is located to the outer surface of the pin engagement portion 37a of the slider which is located in the closed position when the disc cartridge 6 is loaded in the cartridge holder 3 by reversing the cartridge 6 upside down.

The initial set angle of the opening/closing arms 4 and 5, i.e., the angle θ formed with respect to the insertion direction F—F of the disc cartridge 6 by a line E—E connecting the pivot shaft 4b(5b) of the arm 4(5) and the pin 4a(5a) during the insertion of the disc cartridge 6 under the condition the disc cartridge 6 is not inserted into the cartridge holder 3, could largely affect the loading force of the disc cartridge 6. If this angle θ would be set at a small level, the loading force would be increased to deteriorate the operational feeling.

Figure 5:
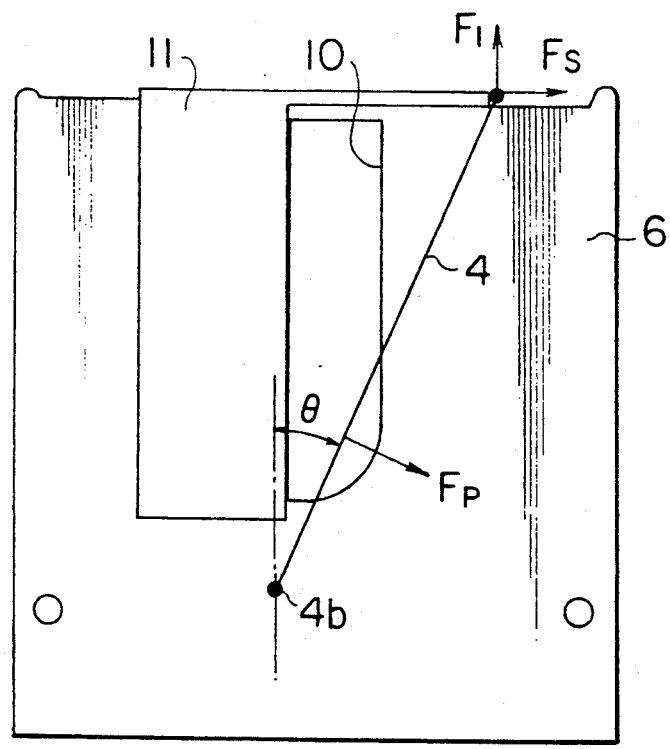

As schematically shown in FIG. 5, the loading force $F_1$ is given as follows:

$$F_1 = \frac{\tan\theta}{\tan\theta - \mu} \left( \frac{F_s}{\tan\theta} + \frac{F_p}{\sin\theta} \right)$$

where $F_1$ is the loading force of the disc cartridge, θ is Fs is the closing force of the shutter 11, Fp is the returning force of the opening/closing arm 4(5), the angle defined between the line E—E and the line F—F, and μ is the coefficient of friction when the pin 4a(5a) slidingly moves along the front edge of the disc cartridge 6.

For instance, in the case of the optical disc drive apparatus for a portable type disc, in order to ensure the closure of the shutter 11 in the non-use state, it is necessary to set the closing force Fs of the shutter 11 at 1.5 N(newton) or more. In order to ensure the return of the opening/closing arm 4(5) to the original position, it is necessary to set the returning force Fp of the opening/closing arm 4(5) at 0.2 N or more. It is to be noted that the frictional coefficient μ between the pin 4a(5a) and the disc cartridge 6 is approximately 0.2.

Figure 6:
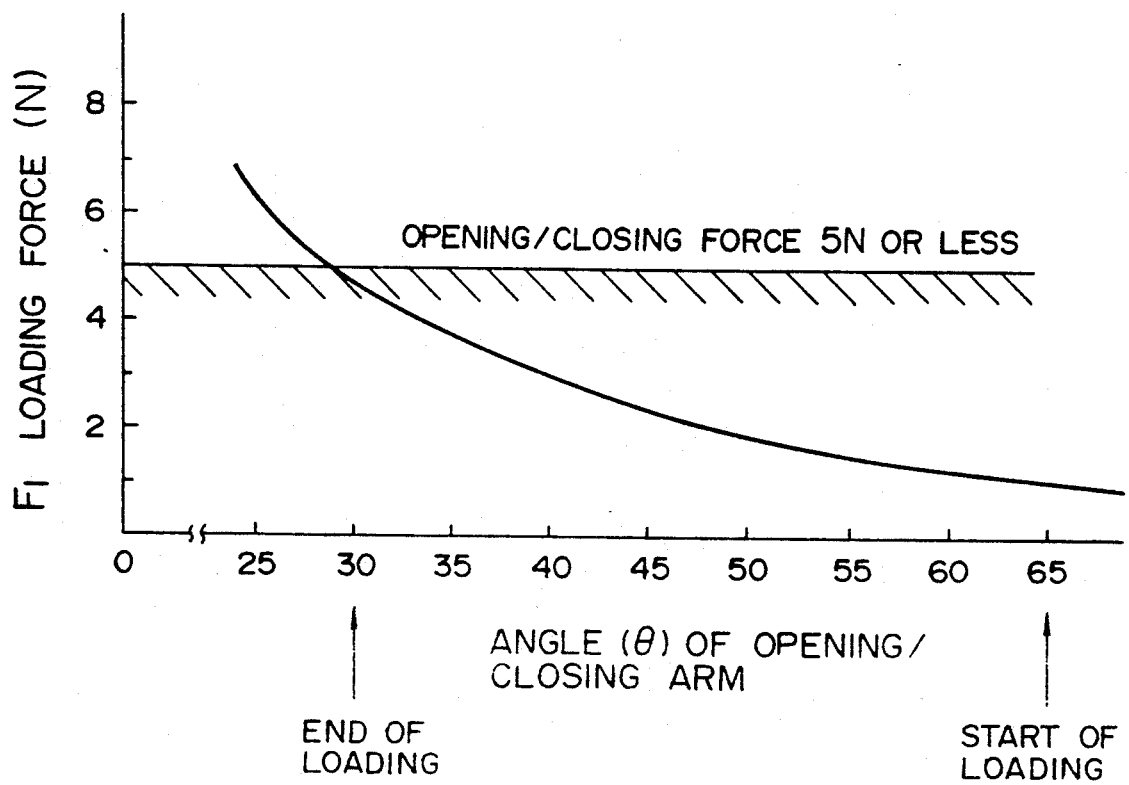

FIG. 6 shows a relationship between the angle θ and the loading force $F_1$, determined by the above equation, in the optical disc drive apparatus. Experientially, if the loading force $F_1$ would exceed 5 N, the operational feeling would be worse so that it would be difficult to practically apply the case. Accordingly, as is also apparent from the graph of FIG. 6, it is to be understood that the angle θ of the arm must be used in the range of 29 degrees or more and in order to meet this, the set angle of the arm in the non-use state must be 65 degrees.

On the stop end 3a side of the disc cartridge in the cartridge holder 3, there are provided a sensor 51 for detecting whether or not the disc cartridge 6 is inserted up to a predetermined position and the shutter 11 is completely opened, and a shutter holding means 52 for holding the shutter 11, opened by the opening/closing arm 4 or 5, at a predetermined open position.

The sensor 51 is used to constitute a switch means for a drive source (not shown) for moving the cartridge holder 3 up and down. When the disc cartridge 6 is inserted to the predetermined position and the shutter is completely opened, the drive source is started to lower the cartridge holder 3 toward the turntable 1.

Figure 7:
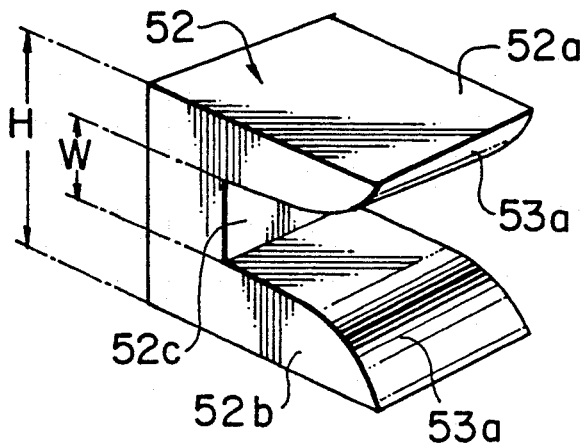

FIG. 7 is a perspective view showing a first example of a shutter holding member 52. A side shape of the shutter holding member is substantially in the form of a U-shape composed of an upper piece 52a, a lower piece 52b and a connecting piece 52c connecting these pieces to each other. Chamfered portions 53a for facilitating the insertion of the head insertion portion 35 of the slider 22 are formed at an inner end of portions of the upper piece 52a and the lower piece 52b. An overall height H of the shutter holding member 52 is equal to or smaller than a thickness S of the cartridge case 21. A width W between the inner surfaces of the upper and lower pieces 52a and 52b is somewhat larger than the thickness of the head insertion portion 35 of the slider 22. The shutter holding member 52 according to this example is located at a position to be engageable with an end face formed between the head insertion portion 35 of the slider 22 and the shutter mounting portion 36 when the shutter 11 is opened to the full open position.

Figure 8:
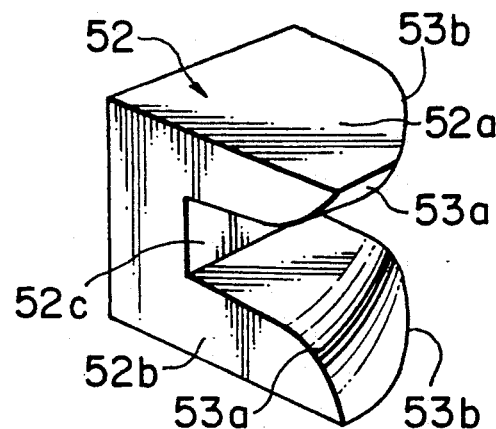

FIG. 8 is a perspective view showing a second example of the shutter holding member 52, in which in order to facilitate the engagement with the slider 22, one chamfering 53b is effected also in the side portion of both upper piece 52a and lower piece 52b. The other structure thereof is the same as that of the shutter holding member according to the first example.

Figure 9:
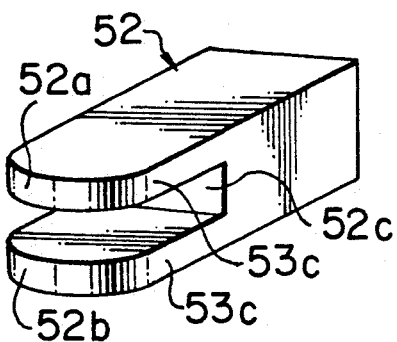

FIG. 9 is a perspective view showing a third example of the shutter holding member 52, in which in order to facilitate the engagement with the slider 22, the chamfering 53c is effected also on both sides of the end portions of the upper and lower pieces 52a and 52b. The other structure thereof is the same as that of the shutter holding member according to the first example.

Figure 10:
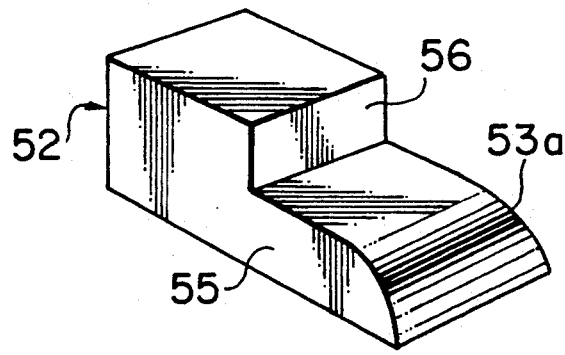

FIG. 10 is a perspective view showing the shutter holding member 52 in accordance with a fourth example, in which in order to simplify the structure, the member is formed in an L-shape composed of a horizontal piece 55 and an upright piece 56. The other structure is the same as that of the shutter holding member according to the first example.

Figure 11:
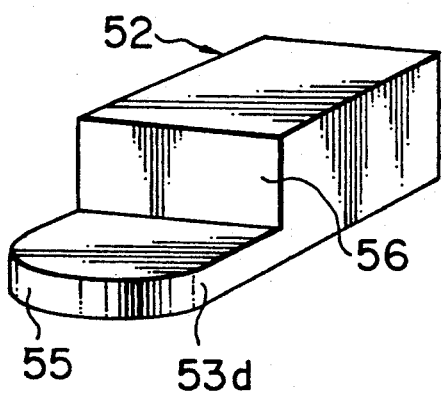

FIG. 11 is a perspective view showing a fifth example of the shutter holding member 52, in which in order to facilitate the engagement with the slider 22, the chamfering 53d is effected on both sides of the end portion of the horizontal piece 55. The other structure thereof is the same as that of the shutter holding member according to fourth example.

Figure 12:
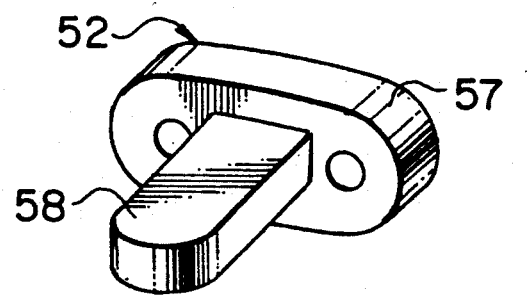
Figure 13:
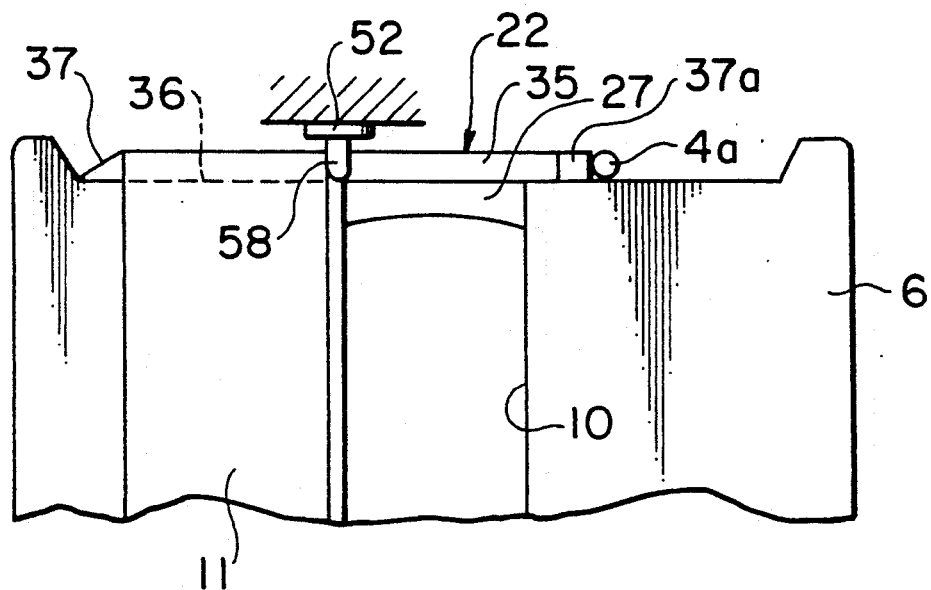
Figure 14:
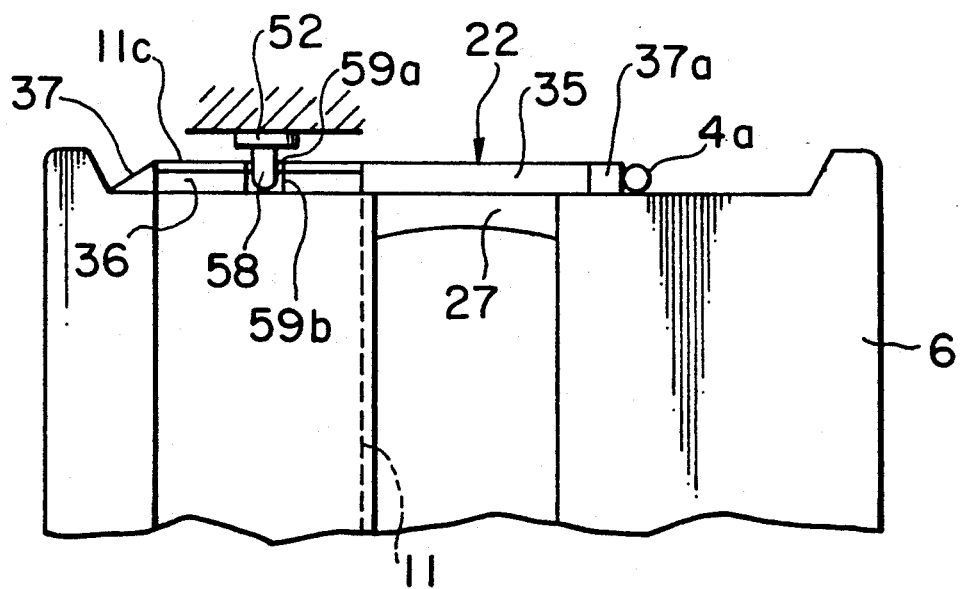

FIG. 12 is a perspective view showing a sixth example of the shutter holding member 52. The holding member is composed of a mounting portion 57 for the cartridge holder 3 and a pin-like retainer portion 58 projected vertically from the mounting portion 57. As shown in FIG. 13, the shutter holding member 52 according to the sixth example may be engaged with the end face formed between the head insertion portion 35 of the slide 22 and the shutter mounting portion 36 when the shutter 11 is fully opened. Also, as shown in FIG. 14, a through hole 59a is formed in the front portion 11c of the shutter 11, and a recessed portion 59b is formed in the shutter mounting portion 36 of the slider 22 in a position corresponding to the through hole 59a. It is thus possible to insert the retainer portion 58 into the recessed portion 59b.

Figure 15:
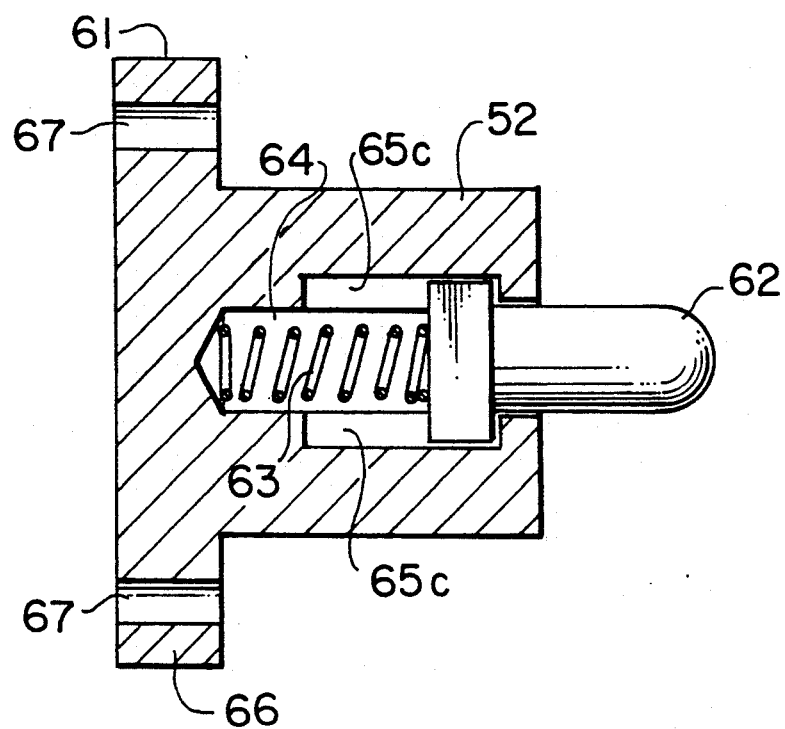

FIG. 15 is a perspective view showing a seventh example of the shutter holding member 52 which is composed of a fixture portion 61 fixed to the cartridge holder 3, an engagement pin 62 provided to be projectable or retractable with respect to the fixture portion, and a spring 63 interposed between the fixture portion 61 and the engagement pin 62 for biasing the engagement pin 62 in a direction in which the engagement pin 62 is projected from the fixture portion 61.

Figure 16:
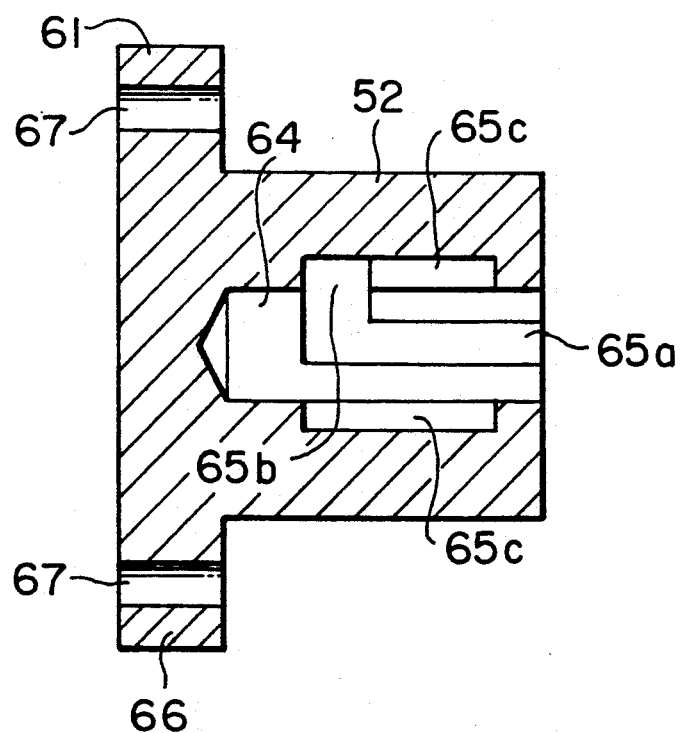
Figure 17:
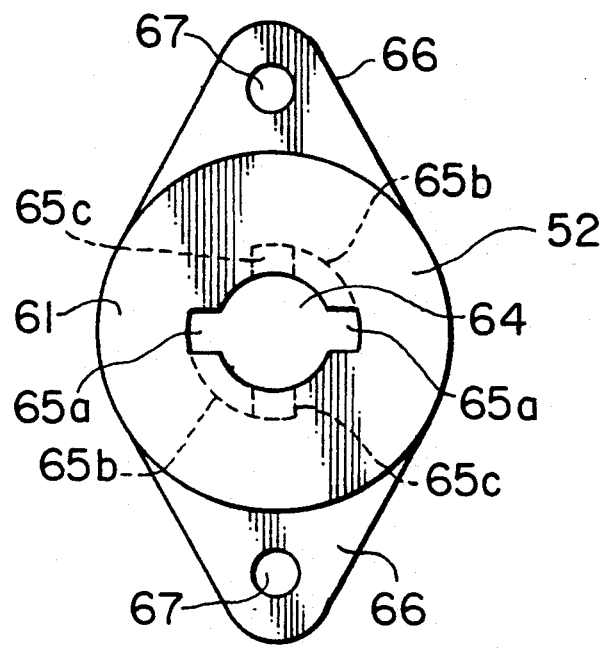

As shown in FIGS. 16 and 17, a hole 64 for slidably receiving the engagement pin 62 is formed in a central portion at one end in the fixture portion 61. In a peripheral surface of the hole 64, there are formed introduction grooves 65 kept in communication with the opening portion of the hole 64 and extending in the axial direction of the hole 64, connecting grooves 65b extending from the terminal end portions of the introduction grooves 65a in the circumferential direction of the hole 64, and guide grooves 65c extending from the terminal end portions of the connecting groove 65b in the axial direction of the hole 64. At the other end of the fixture portion 61, there are formed hubs 66 extending outwardly and provided with screw holes 67.

Figure 18:
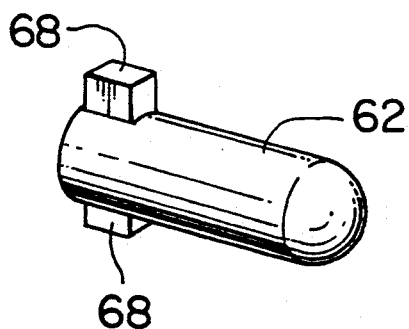

On the other hand, as shown in FIG. 18, at the proximal end of the engagement pin 62, there are formed projections 68 which are insertable into the grooves 65a, 65b and 65c.

The shutter holding member 5 is formed in unison by inserting the grooves 68 extending from the engagement pin 62 into the introduction grooves 65a, the connecting grooves 65b and the guide grooves 65c in this order, after receiving the spring member 63 in the hole 64 formed in the fixture portion 61.

Figure 19:
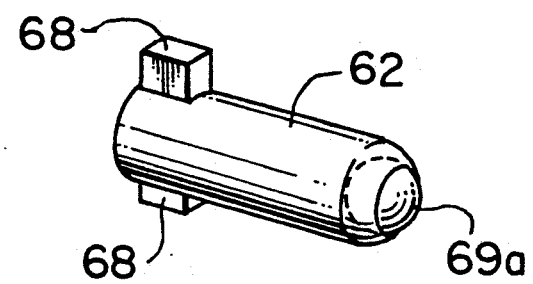

FIG. 19 is a perspective view showing an engagement pin 62 of an eighth example of the shutter holding member 52, in which in order to facilitate the engagement with the slide 22, a rotatable member 69a is provided at an end portion of the engagement pin 62 with its part being exposed outside. The other structure thereof is the same as that of the shutter holding member according to the seventh example.

Figure 20:
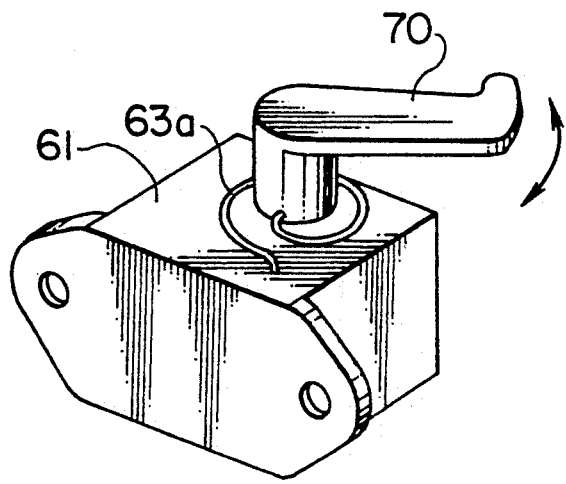

FIG. 20 is a perspective view showing a ninth example of the shutter holding member 52, which is composed of a fixture portion 61, an engagement arm 70 rotatably mounted relative to the fixture portion 61, and a spring member 63a provided between the fixture portion 61 and the engagement arm 70 for normally biasing the engagement arm 70 in a direction opposite the insertion direction of the disc cartridge 6.

Figure 21:
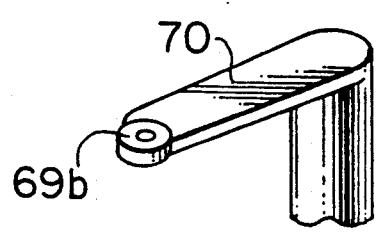

FIG. 21 is a perspective view showing a tenth example of the shutter holding member 52, in which in order to facilitate the engagement with the slider 22, a rotatable member 69b is provided at an end portion of the engagement arm 70 with its part being exposed outside. The other structure thereof is the same as that of the shutter holding member according to the ninth example.

The shutter holding member 52 in accordance with any of the seventh through tenth examples may be engaged with an end face defined between the head insertion portion 35 of the slider 22 and the shutter mounting portion 36 when the shutter 11 is fully opened. Also, a through hole 59a is formed in the front portion 11c of the shutter 11, and a recessed portion 59b is formed in the shutter mounting portion 36 of the slider 22 at a position corresponding to the through hole 59a. The engagement pin 62 or the engagement arm 70 may be inserted into the recessed portion 59b (see FIGS. 13 and 14).

The operation of the disc drive apparatus in accordance with the foregoing embodiment will now be described with reference to FIGS. 32 and 33.

Before the disc cartridge is inserted, as shown in FIG. 4, the cartridge holder 3 is separated away from the turn table 1. Also, as shown in FIG. 32, the two pins 4a and 5a are arranged to be separated away from each other toward the right and left.

Figure 32:
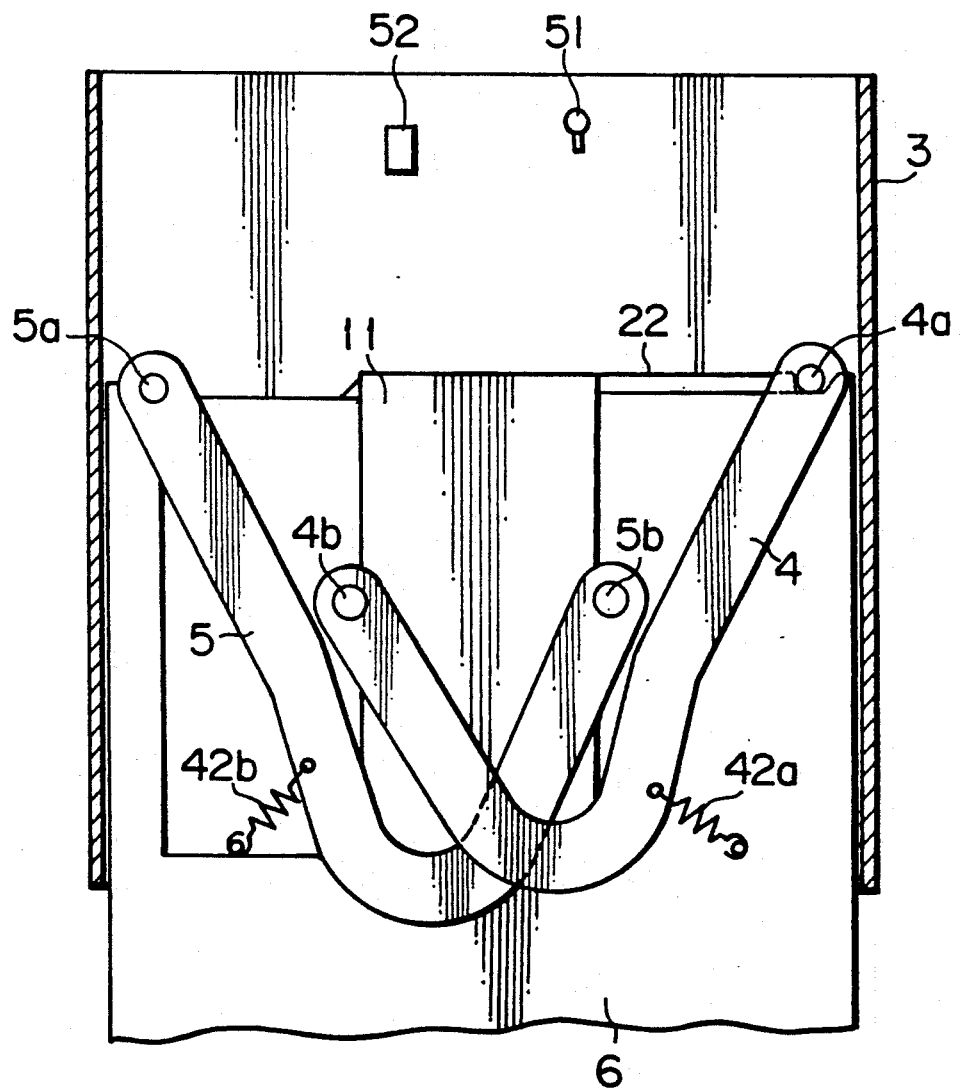
FIGS. 32 and 33 are views illustrating the operation of the disc drive apparatus in accordance with the first embodiment.

When the disc cartridge 6 is inserted into the cartridge holder 3, as shown in FIG. 32, one of the pins 4a comes into contact with the outer surface of the pin engagement portion 37a of the slider 22 held in the closed position. At the same time, the other pin 5a is brought into contact with the front edge portion on the shutter opening side of the disc cartridge.

When the disc cartridge is further inserted, the depression force causes the arms 4 and 5 to move inwardly toward each other, so that the drive force of the first arm 4 causes the shutter 11 to move in the open direction. During the driving movement of the shutter 11 in the open direction, the other pin 5a is encountered with the slider 22. However, since the tapered portion 37 is formed in the slider 22, the pin 5a will ride on the front portion 11c of the shutter 11 without impeding the opening movement of the slider 22.

Figure 33:
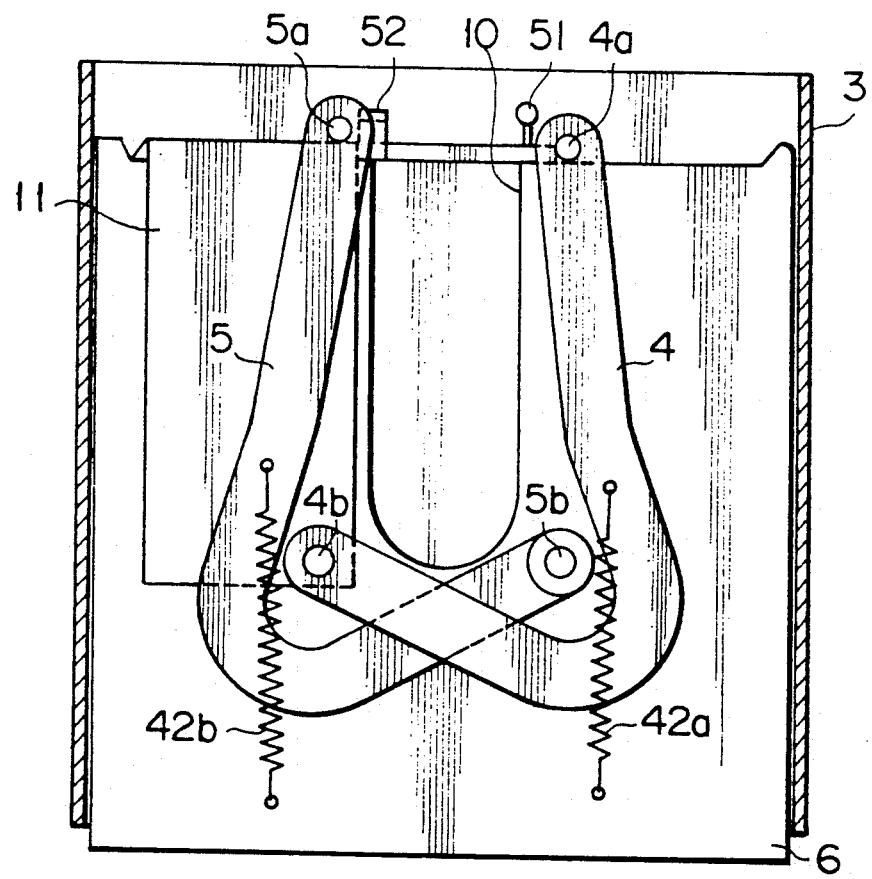

When the disc cartridge 6 is inserted to the rearmost portion 3a of the cartridge holder 3, as shown in FIG. 33, the shutter 11 is kept under the fully closed condition and the shutter holding means 52 is engaged with the slide 22.

On the other hand, simultaneously with this operation, the sensor 51 detects the state in which the disc cartridge 6 is inserted up to a predetermined position and the shutter 11 is fully opened. Then, the cartridge holder 3 is lowered toward the turntable 1 by the driving operation of the drive source (not shown).

Thus, the optical disc 7 is loaded on the turntable 1 for recording/reproducing operations.

In the disc drive apparatus in accordance with the foregoing embodiment, since the two opening/closing arms 4 and 5 are mounted on the ceiling plate 3c of the cartridge holder 3, it is unnecessary to specifically provide a space for the opening/closing arms 4 and 5. It is also possible to miniaturize a planar size of the disc drive apparatus in comparison with the case where the opening/closing arms 4 and 5 are arranged on the side portions of the cartridge holder 3.

In addition, since the two opening/closing arms 4 and 5 cross each other and their proximal end portions are rotatably mounted on the insertion opening side of the cartridge holder 3 with their distal end portions being arranged toward the rear portion of the holder 3, it is possible to increase the initial set angle of the opening/closing arms 4 and 5. It is therefore possible to drive the shutter 11 with a small force to thereby enhance the operational feeling.

Furthermore, since the shutter drive pins 4a and 5a are arranged outside the shutter closing position within the cartridge holder 3, it is possible to engage the pins with the pin engagement portion 37 formed in the slider 22. The two components may be engaged with each other with a sufficient engagement allowance. As a result, it is unlikely that the engagement between the two components would be released during the opening/closing operation of the shutter.

Moreover, since the shutter holding member 52 is arranged in the rearmost portion of the cartridge holder 3, and the shutter 11 opened up to the fully open position is engaged with the shutter holding member 52, even if the pin 4a or 5a would be disengaged from the slider 22 due to some accidental vibration, the shutter 11 would not be closed to thereby avoid in advance a damage of the optical head or the like.

In addition, each of the head inserting opening 3d and the opening 2 is provided in one of the upper and lower sides of the cartridge holder 3, respectively. Thus, the optical head and the outer magnetic field can be accessed to the optical disc 7 from the upper and lower sides of the cartridge holder 3, and the invention can be applied as a disc drive apparatus for the optical and magnetic disc.

A second embodiment of the invention will now be described with reference to FIGS. 34 to 40.

Figure 34:
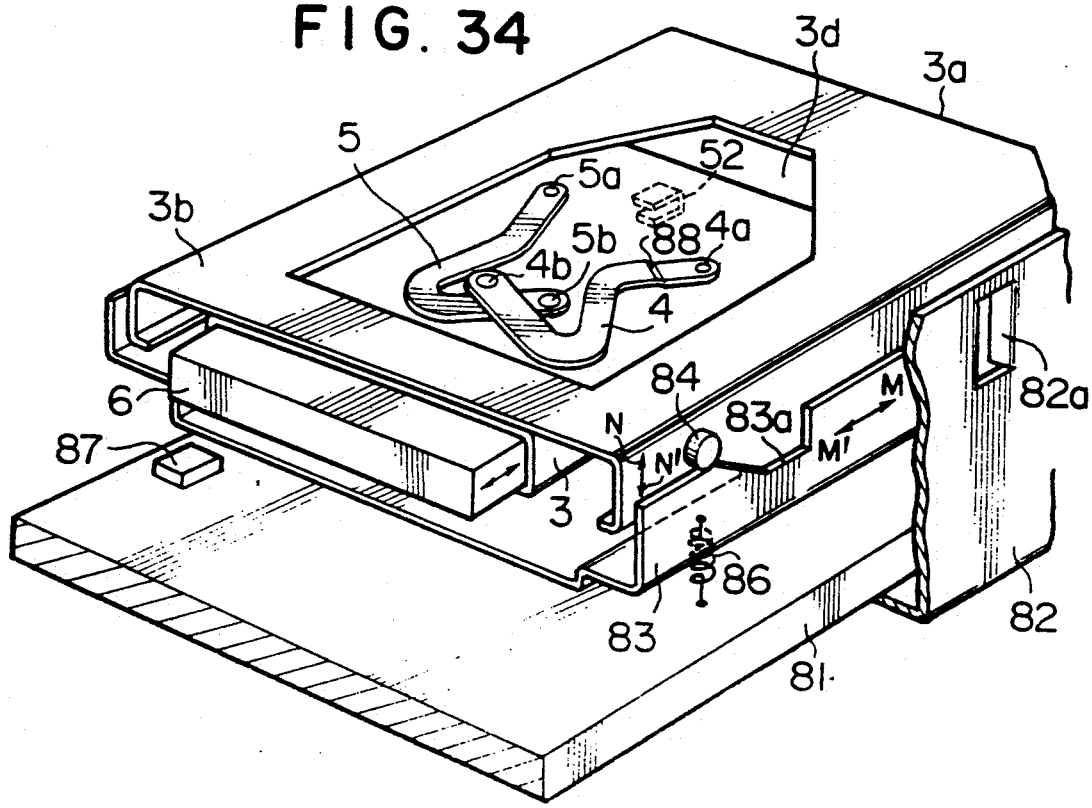

FIG. 34 is a perspective view showing a disc drive apparatus in accordance with the second embodiment, which includes a base 81, an outer wall 82, a bent portion 82a, a holder drive member 83, a cutout 83a, a guide roller 84, a tension spring 86, and a sensor 87. In FIGS. 34 to 40, the same reference numerals are used to indicate the like members or components shown in FIG. 1. Although members and components such as the aforesaid turntable 1 and the optical head are arranged on the base 81, these members have been omitted from the drawings for the sake of simplification.

Referring to FIG. 34, above the base 81, the holder drive member 83 is mounted so as to be movable in the direction indicated by an arrow M (i.e., the insertion direction of the disc cartridge 6) and in a direction M' opposite thereto, and the cartridge holder 3 is located above the holder drive member 83. The cartridge holder 3 is movable up-and-down directions indicated by arrows N and N'. The cartridge holder 3 is biased in the direction N' by a tension spring (not shown). The guide rollers 84 provided on the side surfaces of the cartridge holder 3 are laid on the upper surfaces of the side walls of the holder drive member 83, whereby the movement of the cartridge holder 3 in the direction indicated by the arrow N' is restricted. The cutouts 83a are formed on the upper surface of the side walls of the holder drive member 83 with their portions on the disc cartridge insertion opening side of the cartridge holder 3 being slanted. When the guide rollers 84 enter the cutouts 83a, the cartridge holder 3 is moved or lowered in the direction N'. On the other hand, the guide rollers provided on the side surfaces of the cartridge holder 3 are inserted into the bent portions 82a which are formed by bending the outer wall 82 toward the inside along the arrows N and N', whereby the cartridge holder 3 may move in the directions indicated by the arrows N and N' but cannot move in the directions indicated by the arrows M and M'.

Two pivot shafts 4b and 5b are arranged close to each other and are juxtaposed in a direction perpendicular to the directions indicated by the arrows M and M' on the upper surface of the cartridge holder 3. The first opening/closing arm 4 and the second opening/closing arm 5 are rotatably mounted on the pivot shafts 4b and 5b, respectively. The first opening/closing arm 4 extends on the rear side of the cartridge holder 3 while bypassing the pivot shaft 5b on the insertion opening side of the disc cartridge, whereas the second opening/closing arm 5 extends on the rear side of the cartridge holder 3 while bypassing the pivot shaft 4b in the same manner. Accordingly, these opening/closing arms 4 and 5 cross each other without interfering each other on the insertion opening side of the disc cartridge. Therefore, the mounting levels of the opening/closing arms 4 and 5 at the pivot shafts 4b and 5b are different from each other, and a stepped portion 88 directed downwardly is formed on the higher opening/closing arm 4. The pins 4a and 5a of the opening/closing arms 4 and 5 are provided with the same length to extend downwardly at the end portions kept at the same level.

The first opening/closing arm 4 is biased clockwise about the pivot shaft 4b by a tension spring 42a (not shown), and in the same manner, the second opening/closing arm 5 is biased counterclockwise about the pivot shaft 5b. For this reason, when the disc cartridge 6 is not inserted into the cartridge holder 3, the opening/closing arms 4 and 5 are kept under the condition that they are sufficiently separated from each other. As the disc cartridge 6 is pressingly inserted into the cartridge holder 3, the pins 4a and 5a of the opening/closing arms 4 and 5 are in contact with the end face of the disc cartridge 6. As the disc cartridge 6 is further inserted, the first opening/closing arm 4 is rotated counterclockwise about the pivot shaft 4b, and the second opening/closing arm 5 is rotated clockwise about the pivot shaft 5b, whereby the pin 4a or 5a opens the shutter of the disc cartridge 6 in accordance with the loading condition, i.e., whether an A-side or a B-side of the cartridge is directed upward.

Thus, even if either side of the A- and B-sides is directed upward, the opening/closing arm 4 or 5 may open the shutter by the pin 4a or 5a.

When the disc cartridge 6 is not inserted into the cartridge holder 3, the holder drive member 83 is kept at the limit position in the movement in the direction indicated by the arrow M, and the guide rollers 84 of the cartridge holder 3 are located at an offset position from the cutouts 83a of the side walls of the holder drive member 83. For this reason, the cartridge holder 3 is held under the condition that it is raised in the direction indicated by the arrow N. Under this condition, the disc cartridge 6 may be inserted into the cartridge holder 3.

Thus, the disc cartridge 6 is depressed into the cartridge holder 3, and the shutter is opened by the shutter opening/closing arms 4 and 5. When the disc cartridge 6 is depressed into the rearmost portion of the cartridge holder 3, the sensor (not shown) detects this condition, so that the motor (not shown) is driven to move the holder drive member 83 in the direction indicated by the arrow M'. When the guide rollers 84 enter the cutouts 83a together with the movement of the holder drive member 83, the cartridge holder 3 is lowered in the direction of the arrow N', so that the hub portion of the optical disc 7 received in the disc cartridge is fixedly loaded on the turntable provided below the disc. At this time, the disc cartridge 6 is locked by a lock mechanism (not shown).

A sensor (not shown) detects the fact that the cartridge holder 3 is lowered to a sufficient level that the hub portion of the optical disc 7 may be fixedly loaded on the turntable. The output signal of this sensor causes the motor to stop.

A sensor 87 is provided on the base 81 on the disc cartridge insertion side of the cartridge holder 3. The sensor 87 is operated together with the lowering movement of the disc cartridge 6 and may detect whether or not the disc cartridge 6 is lowered to a predetermined position and whether or not the optical disc 7 is prohibited to record (that is, whether or not the optical disc 7 is in the recording mode). When it is detected by the sensor that the disc cartridge 6 is lowered to the predetermined position, the drive motor drivingly rotates the turntable to thereby rotate the optical disc 7. In addition, when the sensor 87 detect the fact that the optical disc 7 is not in the recordable mode, the recording of the optical disc 7 is prevented.

In the eject state of the disc cartridge 6, the motor is rotated together with the operator's eject operation, and the holder drive member 83 is moved in the direction of the arrow M'. Together with this operation, the guide rollers 84 on the side surfaces of the cartridge holder 3 deviates from the cutouts 83a of the side walls of the holder drive member 83 so that the cartridge holder 3 is raised in the direction of the arrow N. Then, the disc cartridge 6 is depressed by the opening/closing arms 4 and 5 biased in directions of arrows $Q_1$ and $Q_2$, and is strongly pushed out of the cartridge holder 3. The shutter of the disc cartridge 6 is biased in the direction in which the shutter is closed, and the disc cartridge 6 is pushed out by the opening/closing arms 4 and 5. Then, the shutter is automatically closed.

Figure 35A:
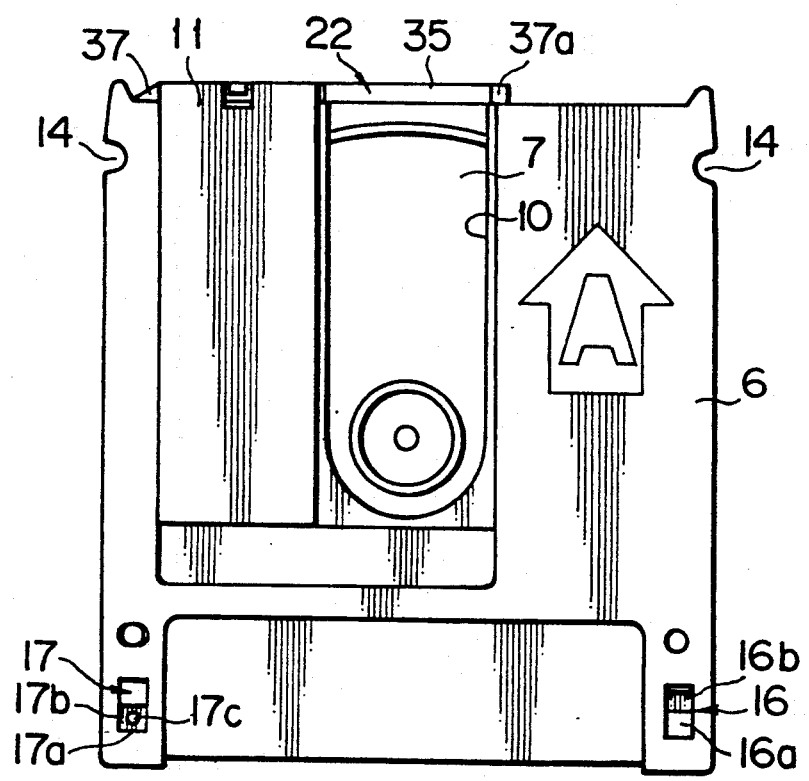
FIGS. 35A and 35B are plan views of the disc cartridge with the shutter open on one side and closed on the other side, respectively.
Figure 35B:
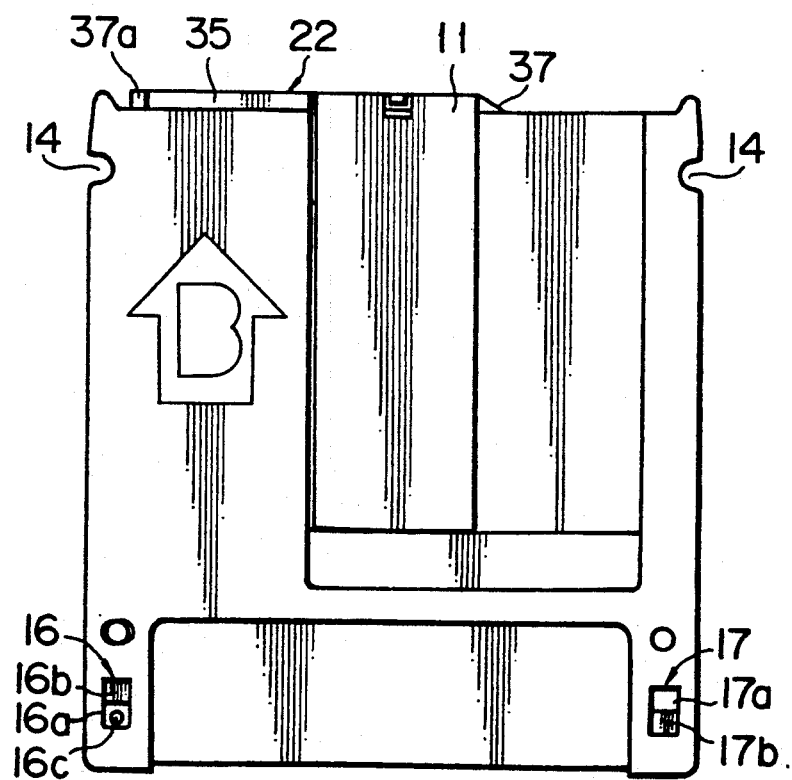

FIGS. 35A and 35B show an outer appearance of the disc cartridge 6. FIG. 35A shows the B-side with the shutter being opened, and FIG. 35B shows the A-side with the shutter being closed.

In FIGS. 35A and 35B, the windows of the two sides of the disc cartridge 6 are overlapped with each other (In the B-side shown in FIG. 35B, the window cannot been seen by the shutter 11). At a front end face of the disc cartridge 6, the slider 22 is provided to be slidable along the front end face. A U-shaped shutter 11 is mounted on the slider 22 so as to cover or clamp the slider 22 and the disc cartridge 6 body. The shutter 11 has a shape and a dimension so as to cover the windows. The shutter 11 is normally closed, as shown in FIG. 34B, by a spring member (not shown).

In the disc cartridge 7, erroneous erasure preventing mechanisms 16 and 17 are provided at both corner portions opposite to the shutter 11 in the A- and B-sides, respectively. The erroneous erasure preventing mechanisms 16 and 17 are located in symmetrical relation with respect to the centerline of the disc cartridge 6 perpendicular to the direction of movement of the shutter 11.

The erroneous erasure preventing mechanism 16 and 17 are composed of openings 16a and 17a penetrating the two surfaces and door members 16b and 17b slidable within the openings 16a and 17a, respectively. The door members 16b and 17b are operated by operational members 16c and 17c provided on both the top and bottom surfaces, and are switched over between two conditions where the openings 16a and 17a are fully opened and partially opened.

When the door members 16b and 17b fully close the openings 16a and 17b, the A-side and B-side of the optical disc 7 are recordable. When the door members 16b and 17b partially open the openings 16a and 17a, the recording of A-side and B-side of the optical disc is impossible. The other structure thereof is the same as that of the disc cartridge of FIG. 22.

Subsequently, the operation of the opening/closing arms 4 and 5 performed when the disc cartridge 6 is loaded on the cartridge holder 3 in accordance with this embodiment will be explained in more detail.

Figure 36:
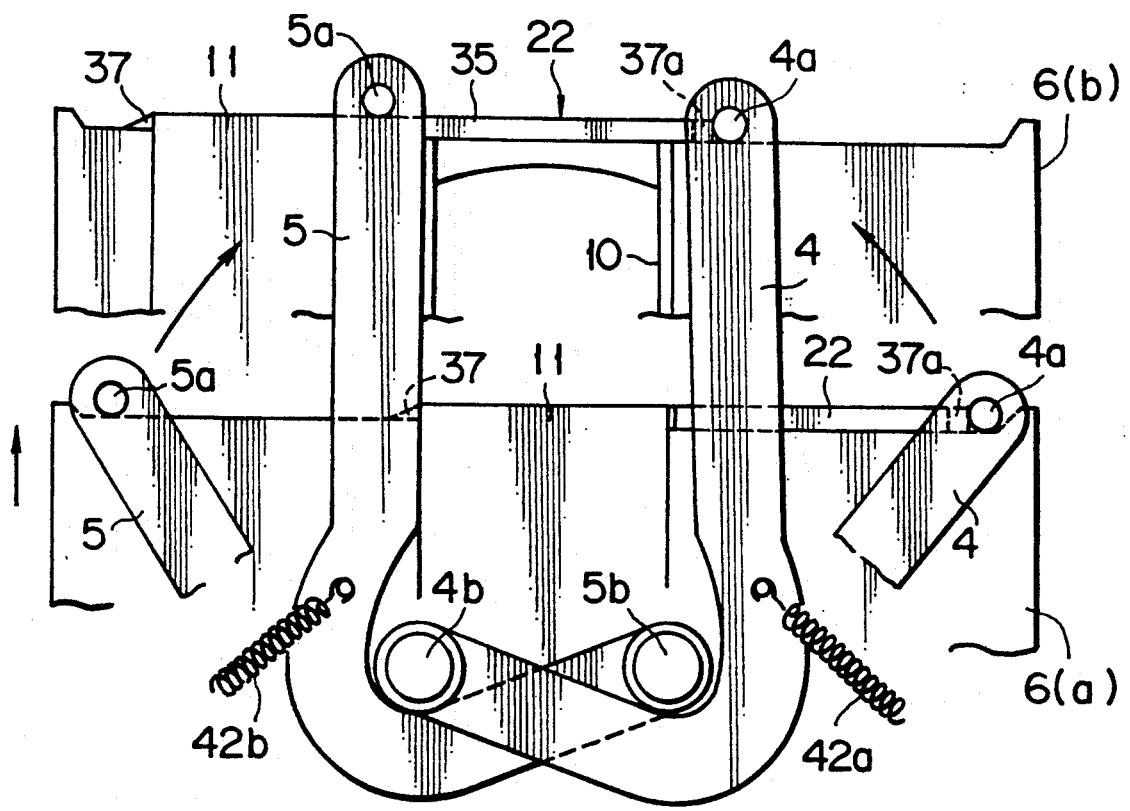

FIG. 36 is a view showing the rotational condition during the loading operation and the structure of the opening/closing arms 4 and 5, in which the same reference characters and numerals are used to indicate the like members or components already explained.

In FIG. 36, reference character 6(a) indicates the disc cartridge which has started abutment of the end face with the pins 4a and 5a, and reference character 6(b) indicates the disc cartridge which has completed the loading into the cartridge holder 3. The opening/closing arms 4 and 5 as a whole are indicated under the condition that they are kept in abutment with the disc cartridge 6(b). In the condition of abutment with the disc cartridge 6(a), the end portions thereof are schematically shown.

The opening/closing arms 4 and 5 are composed of bent portions to be mounted on the pivot shafts 4b and 5b and linear portions on the tip end side, respectively. The bent portions bypass the pivot shafts 4b and 5b on the disc cartridge insertion opening side (in the direction of arrow M'). Accordingly, the opening/closing arms 4 and 5 cross each other so as not to interfere with each other in the direction of arrow M' beyond the pivot shafts 4b and 5b. For this reason, the heights of the bent portions from the cartridge holder 3 are different from each other. It should be assumed that the height of the arm 4 is greater than that of the other arm 5. The first opening/closing arm 4 is normally biased clockwise about the pivot shaft 4b by a tension spring 42a. In the same manner, the second opening/closing arm 5 is normally biased counterclockwise about the pivot shaft 5b by a tension spring 42b.

The rotational limit of the first opening/closing arm 4 in the clockwise direction and the rotational limit of the second opening/closing arm 5 in the counterclockwise direction are restricted by stoppers (not shown). When the opening arm 4 is located within the rotational limit, the pin 4a of the opening/closing arm 4 is held in contact with the pin engagement portion 37a and the end face of the disc cartridge 6(a) without fail, and the pin 5b of the second opening/closing arm 5 is brought into contact with the other side edge portion of the disc cartridge 6. The rotational limits are thus set.

Figure 37A:
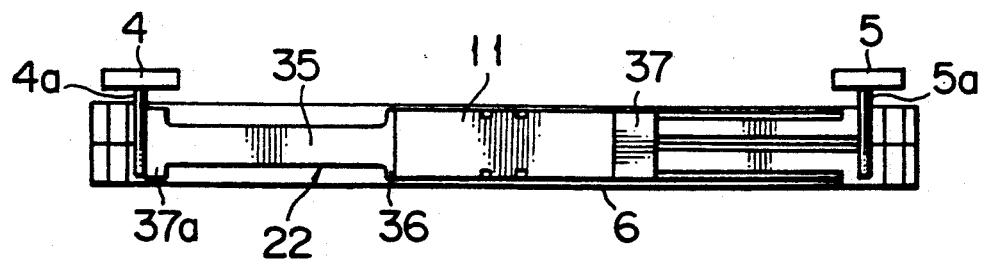
FIGS. 37A and 37B are front views showing the engagement condition between the pin and the disc cartridge on both sides of the disk cartridge.

FIG. 37A shows a condition that the pins 4a and 5a are brought into contact with the disc cartridge 6(a).

Figure 37B:
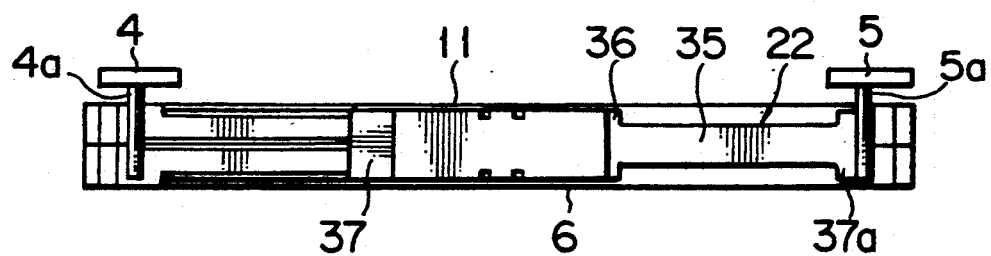

As described above, the heights of the opening/closing arms 4 and 5 are different from each other. However, since the heights of the tip end portions of the arms are kept at the same level by providing a stepped portion 88 in the opening/closing arm 4, the length of the pins 4a and 5a on the tip end portions is the same and the pins 4a and 5a are restricted so that they are well contacted with the disc cartridge 6 in the thickness direction of the disc cartridge 6(a). Thus, the pins 4a and 5a are contacted in a sufficient range of the thickness of the disc cartridge 6(a) and the pin 4a is further contacted with the pin engagement portion 37a of the slider 22. When the disc cartridge 6(a) is inserted into the cartridge holder 3 by reversing the top and bottom thereof, the pin 5a of the opening/closing arm 5 is brought into contact with the disc cartridge 6(a) and the pin engagement portion 37a of the slider 22. As shown in FIG. 37B, the contact condition is the same as that shown in FIG. 37A which shows the case of the pin 4a.

Turning back to FIG. 36, when the disc cartridge 6(a) is further inserted in the direction opposite to the arrow M', the pins 4a and 5a are pressed by the disc cartridge 6(a), so that the opening/closing arm 4 is rotated counterclockwise about the pivot shaft 4b and the opening/closing arm 5 is rotated clockwise about the pivot shaft 5b. Thus, the slider 22 is moved leftward by the pushing force of the pin 4a and the shutter 11 is gradually opened. However, the pin 5a rides from the tapered portion 37 over the slider 22 which moved leftward.

In the disc cartridge 6(b) which has been loaded, the shutter 11 is fully opened. At this time, the opening arm 4 is stopped at a position offset from the window 10. As the pin 5a rides over the slider 22, the opening/closing arm 5 has been rotated more than the arm 4. However, this arm 5 is also positioned in the offset condition from the window 10.

Under such a condition, when an accidental rotational force is applied to the opening/closing arms 4 and 5, there is a case where the arms would be further rotated. However, the pivot shaft 5b serves as a stopper for the opening/closing arm 4. The opening/closing arm 4 is brought into contact with the pivot shaft 5b, so that the arm 4 cannot further rotate. Also, the pivot shaft 4b serves as a stopper for the opening/closing arm 5. The opening/closing arm 5 is brought into contact with the pivot shaft 4b so that the arm 5 cannot further rotated. Even if the opening/closing arms 4 and 5 would be brought into contact with the pivot shafts 5b and 4b, respectively, the shapes of the opening/closing arms 4 and 5 and the positions of the pivot shafts 4b and 5b are selected so that they are offset from the window 10.

As described above, the opening/closing arms 4 and 5 are always positioned at the offset relation from the window 10. Thus, there is no fear that foreign matters would enter the disc cartridge 6 through the window 10 from the opening/closing arms 4 and 5.

On the other hand, the pivot shafts 4b and 5b, the tension springs 42a and 42b and the like are provided on the cartridge holder 3, and the rotation of the opening/closing arms 4 and 5 is almost performed on the cartridge holder 3. The space of the shutter opening/closing mechanism of these components is substantially overlapped with the space of the cartridge holder 3 in a planar two-dimensional relation, and is just located above the cartridge holder 3 in a vertical two-dimensional sense. Accordingly, the disc drive apparatus is not be enlarged in size due to the provision of the shutter opening/closing mechanism.

Figure 38:
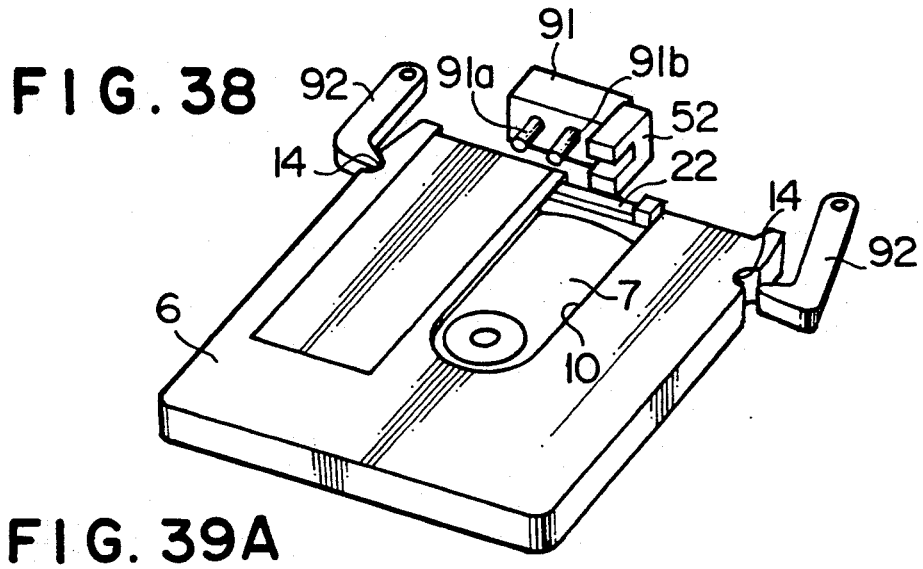

FIG. 38 is a view showing the condition immediately before the loading operation of the disc cartridge 6 within the cartridge holder 3. Reference numeral 91 denotes a sensor; 91a denotes a judgement portion for A/B sides; 91b denotes a cartridge insertion/shutter opening-closing confirmation section; and 92 denotes lock members. The same reference characters are used to denote the like components or members already explained.

In FIG. 38, a shutter holding member 52 and a sensor 91 are provided in the rear portion of the cartridge holder 3 (see FIG. 34). In the disc cartridge 6 which has been almost loaded, the shutter 11 is almost fully opened. When the disc cartridge 6 is further inserted into the cartridge holder 3, and the tip end portion of the disc cartridge 6 is brought into contact with the shutter holding member 52. At the same time, the lock members 92 are engaged with the cutouts 6a formed in the side surfaces of the disc cartridge 6. At this time, the shutter holding member 52 is adapted to limit the loading position of the disc cartridge 6. At the same time, the shutter 11 is held in the fully opened position. Even if the shutter is held in the fully opened condition, as shown in FIG. 36, the slider 22 of the shutter 11 is pressed by the pins 4a and 5a of the opening/closing arms 4 and 5. However, if the pins 5a and 5b are disengaged from the slider 22 due to some causes, the shutter 11 is moved in a direction in which the shutter 11 is automatically closed. As a result, the optical head would be damaged. The shutter holding member 52 serves to prevent such an accident.

The sensor 91 is composed of the A/B side judgement section 91a and the cartridge insertion/shutter opening-closing confirmation section 91b. The A/B side judgement section 91 has a rod depressed by the connecting surface for connecting the respective surfaces of the shutter 11 fully opened when the disc cartridge 6 is inserted into the cartridge holder 3, for example, with the A-side being directed upward. When the disc cartridge 6 is inserted into the disc cartridge holder 3 with the B side being directed upward, the direction of the movement of the shutter 11 is reversed, so that the rod of the A/B side judgement section 91a is not depressed. Therefore, it is possible to recognize the side of A/B of the disc cartridge 6.

The cartridge insertion/shutter opening-closing confirmation section 91b is used to confirm whether or not the disc cartridge 6 is loaded in a normal condition together with the shutter holding member 52 and whether or not the shutter 6 is fully opened. When the shutter 6 is fully opened, the disc cartridge 6 is regularly positioned at the shutter holding member 52. Thus, the rod of the cartridge insertion/shutter opening-closing confirmation section 91b is depressed so that it is confirmed that the disc cartridge 6 is loaded by the fully opening action of the shutter 11. However, when the loading operation is performed while the shutter 11 is being not fully opened, the portion of the tip end portion of the disc cartridge 6 in confronted relation to the shutter holding member 52 is thickened by an extent corresponding to the thickness of the shutter 11, as a result, the shutter holding member 52 cannot support the tip end portion of the disc cartridge 6. By this extent, the insertion amount of the disc cartridge 6 becomes insufficient. For this reason, the rod of the cartridge insertion/shutter opening-closing confirmation section 91b is not depressed by the front face of the disc cartridge 6. When the disc cartridge 6 is regularly loaded, even if either one of the A and B sides is directed upwardly, the rod of the cartridge insertion/shutter opening-closing confirmation section 91b is depressed by the front face of the disc cartridge 6. Thus, it is confirmed whether or not the disc cartridge 6 is regularly loaded.

When it is confirmed by the cartridge insertion/shutter opening-closing confirmation section 91b that the disc cartridge 6 is regularly loaded, an automatic loading mechanism (not shown) in started to operate. The judgement result of the A/B side judgement section 91a is indicated on an indication section or the like.

Figure 39A:
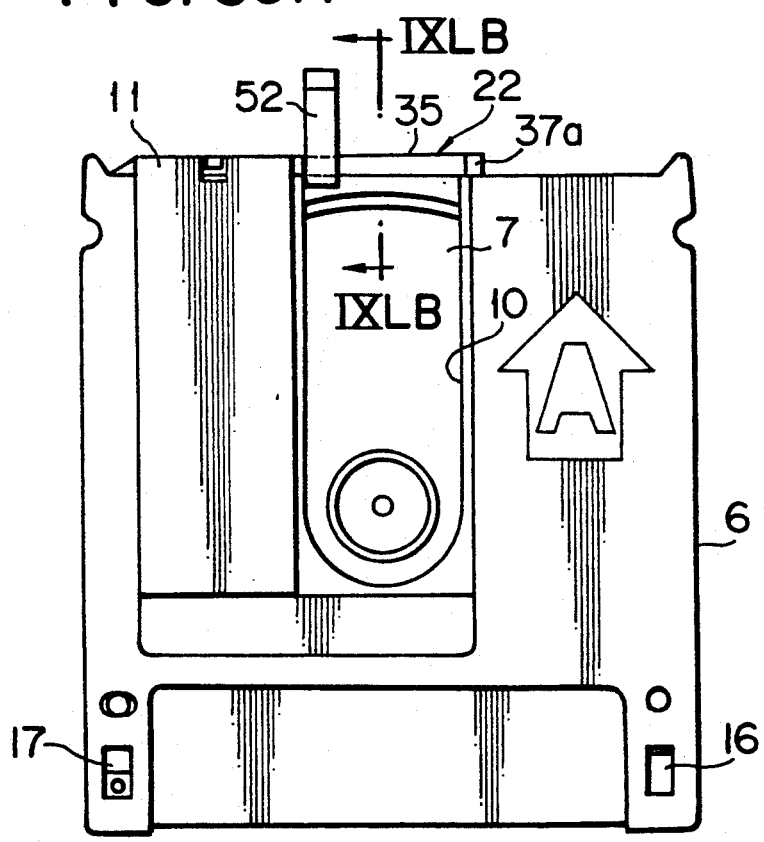
FIGS. 39A and 39B are views showing the engagement condition between the shutter and the shutter holding member.
Figure 39B:
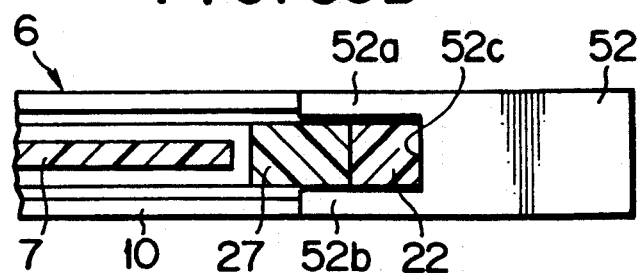

FIGS. 39A and 39B show the condition that the disc cartridge 6 is supported by the shutter holding member 52. FIG. 39A is a plan view thereof and FIG. 39B is a cross-sectional view of the disc cartridge as viewed from the center line X—X'. The same components as those already explained are designated the same reference characters or numerals.

In FIGS. 39A and 39B, in the both sides of the disc cartridge 6, a reinforcement portion 27 recessed more than the case surfaces is formed between the window 10 and the end faces of the case. Both the side of the reinforcement section 27 are formed so that the reinforcement portion 27 has a thickness equal to or somewhat larger than that defined by the upper and lower surfaces of the head insertion portion 35 of the slider 22. Accordingly, the thickness of the reinforcement portion 27 and the thickness of the head insertion portion 35 of the slider 22 are smaller than that of the body case of the disc cartridge 6.

A width of the shutter holding member 52 is sufficiently smaller than that of the window 10. A distance between the upper piece 52a and the lower piece 52b of the shutter holding member 52 is somewhat larger than the thickness of the head insertion potion 35 of the slider 22 and the reinforcement portion 27.

As the disc cartridge 6 is inserted into the cartridge holder 3 while opening the shutter 11, the head insertion portion 35 of the slider 22 and the reinforcement portion 27 are inserted into the shutter holding member 52 and the slider 22 is brought into contact with the connecting piece 52c. Thus the loading position of the disc cartridge 6 is regulated. When the disc cartridge 6 is thus positioned, the upper piece 52a of the shutter holding member 52 is held in close and confronted relation with the upper side shutter plate of the shutter 11. The lower piece 52b is held in close and confronted relation with the lower side shutter plate. Thus, even if the pins 4a and 5b of the opening/closing arms 4 and 5 are disengaged from the pin engagement portion 37a of the slider 22 in the shutter 11 fully opened, the shutter 11 is brought into abutment with the upper pieces 52a and the lower piece 52b of the shutter holding member 52 and is held under the fully closed condition.

Figure 40:
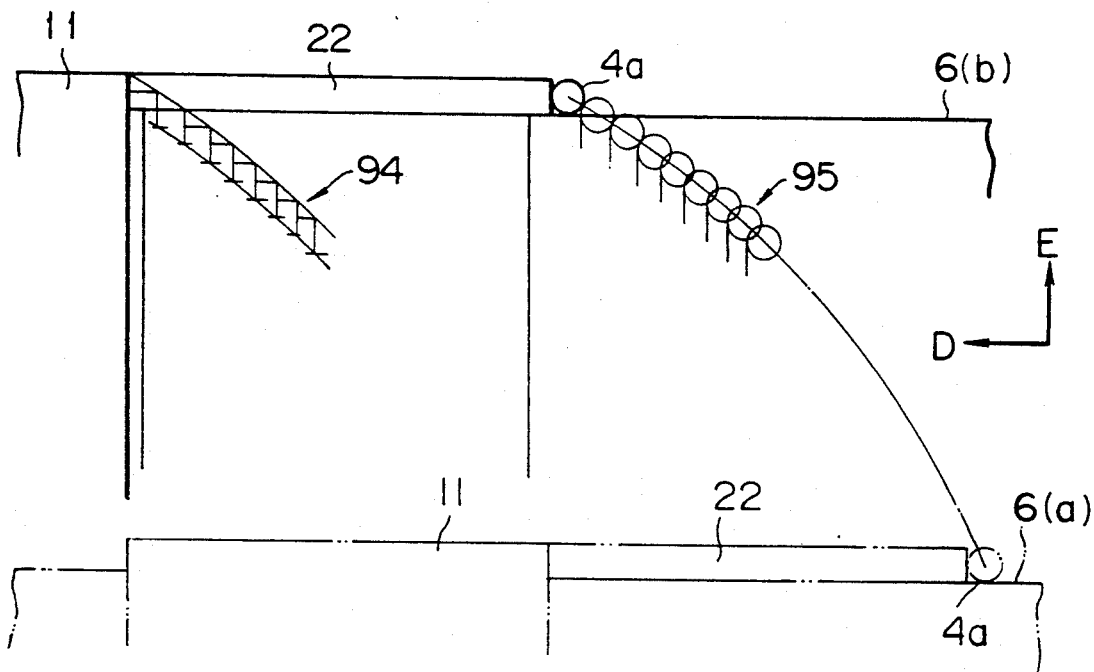

As shown in FIG. 40, the shutter 11 is opened in a direction indicated by an arrow A from the condition of the disc cartridge 6(a) to the condition of the disc cartridge 6(b) during the loading operation. The upper right corner of the shutter 11 is moved in the direction of the arrow D while being moved in the direction of the arrow E. Its locus is shown by the arrow 94. The locus 94 transverses the slider 22 of the shutter 11 and the reinforcement portion 27 of the disc cartridge 6 immediately before the completion of the loading operation of the disc cartridge 6. In this case, the reinforcement portion 27 and the head insertion portion 35 of the slider 22 are inserted into the shutter holding member 52.

It should be noted that reference numeral 95 indicate the locus of movement of the opening/closing arm.

In the disc drive apparatus in accordance with the second embodiment, the through hole 3d is formed in the ceiling plate 3b of the cartridge holder 3. The shape, the arrangement and the rotational range of the opening/closing arms 4 and 5 are selected so that, when the disc cartridge 6 is inserted up to the insertion completion position of the cartridge holder 3, the opening/closing arms 4 and 5 do not overlap any part of the window 10 formed in the cartridge case. Accordingly, for example, for driving a disc drive apparatus of such a type that the an external magnetic field or the like is arranged on the upper surface side of the disc cartridge 6 through the through hole, such as a magnetooptical disc drive apparatus, there is no hindrance to the recording/reproducing operation.

Other embodiments of the invention will now be described.

Figure 41:
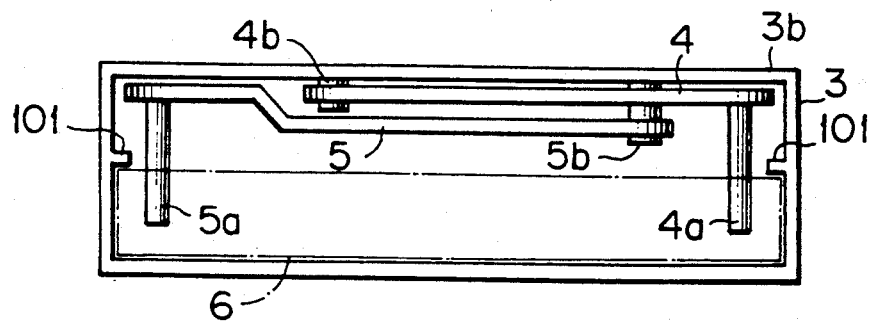
FIGS. 41 to 52 show other embodiments of the invention.

Although, in the foregoing embodiments, the opening/closing arms 4 and 5 are set on the upper surface of the ceiling plate 3b of the cartridge holder 3, as shown in FIG. 41, the shutter opening/closing arms 4 and 5 may be set on an inner surface of the cartridge holder 3. In this case, it is preferable to provide a guide plate 101 below the arms 4 and 5 in order to prevent the disc cartridge 6 from vibrating within the cartridge holder 3.

Figure 42:
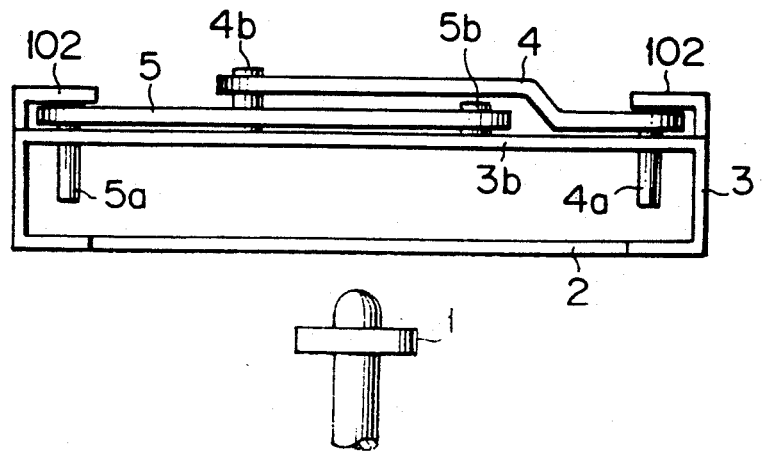

Although, in the foregoing embodiments, there is no means for preventing the vibration or deformation of the opening/closing arms 4 and 5, as shown in FIG. 42, an arm retainer plate 102 is provided on the cartridge holder 3 to thereby retain the opening/closing arms 4 and 5.

Figure 43:
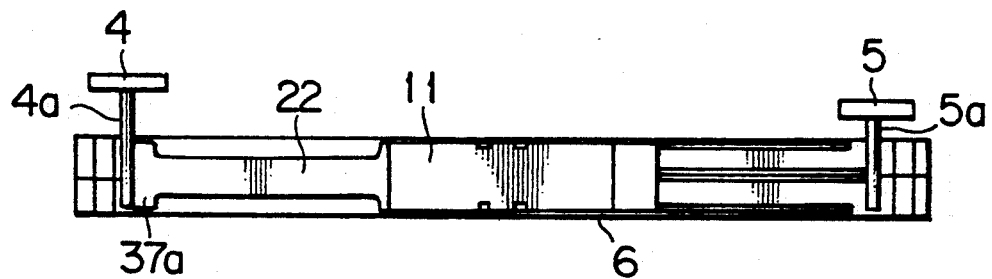

In addition, although, in the foregoing embodiment, as shown in FIG. 37, the tip end portions of the respective opening/closing arms 4 and 5 are set at the same level relative to the cartridge holder 3, and the same length pins 4a and 5a are provided at the tip end portions of the opening/closing arms 4 and 5, respectively, as shown in FIG. 43, the tip end portions of the opening/closing arms 4 and 5 may be set in different levels relative to the cartridge holder 3, and the pins 4a and 5a having different lengths may be provided in the type end portions of the opening/closing arms 4 and 5, respectively.

Figure 44:
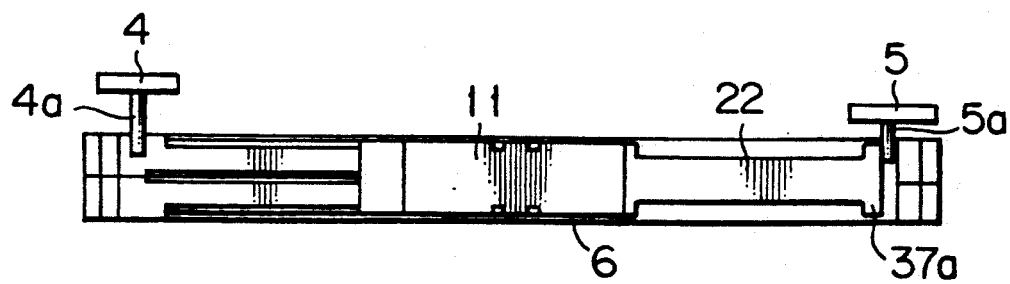

In the foregoing embodiments, also shown in FIG. 37, the pins 4a and 5a extending to a bottom side of the slider 22 are provided at the ends of the respective opening/closing arms 4 and 5 so that the pins 4a and 5a may contact with the end race of the slider 22 over its full thickness. However, as shown in FIG. 44, the lengths of the pins 4a and 5a may be much shortened so that the pins 4a and 5a may be brought into contact with the end face of the slider over a part of its thickness as shown in FIG. 44. Since in the foregoing embodiments, the pin engagement portion 37a having a wide thickness is formed at the end face of the slider 22, it is possible to sufficiently keep the effective engagement length between the pin 4a or 5a and the slider even with such an arrangement, and it is unlikely that the pin 4a or 5a would be disengaged from the slider 22 during the driving operation.

Further, it is apparent that the present invention is applied to the disc drive apparatus and the disc cartridge is not limited to those of the foregoing embodiments.

Figure 45:
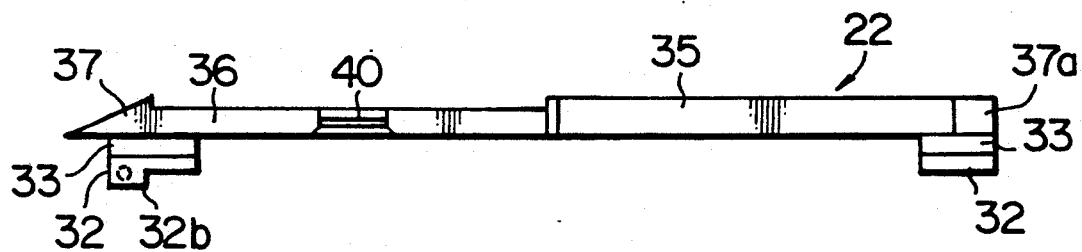
Figure 46:
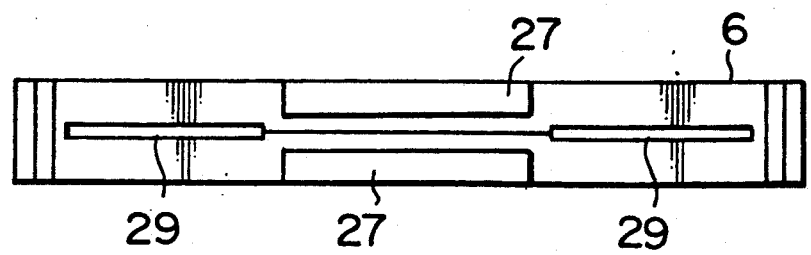

For instance, although in the foregoing embodiments, the rear face portion 32 and the connecting portion 33 of the slider 22 are formed over the almost full length of the slider, it is possible to form the rear face portions 32 and the connecting portions 33 only at the both-end portions of the slider 22 as shown in FIG. 45. If such a slider is used, it is possible to use a cartridge case 21 where slider insertion holes 29 are formed only on the both-end portions through the reinforcement portion 27 as shown in FIG. 46.

Figure 47:
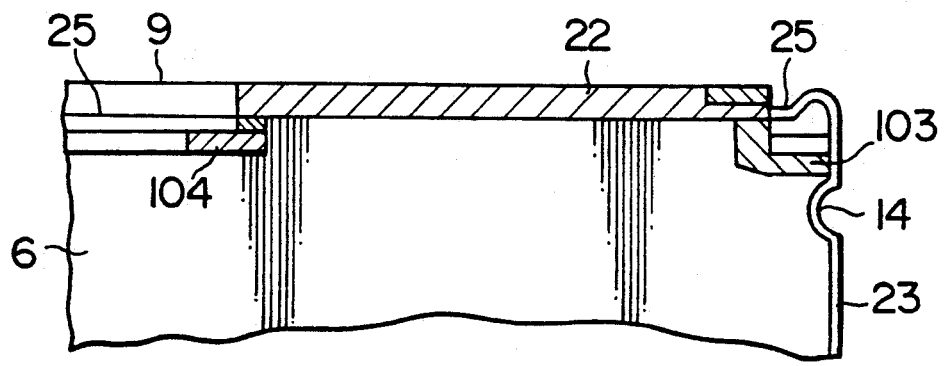

On the other hand, as shown in FIG. 47, a stopper 103 and a guide portion 104 are formed in the longitudinal direction of the slider 22 from each end portion, and the end portion of the stopper 103 is brought into contact with the connecting wall 23 formed in the cartridge case 21, whereby it is possible to limit the set position of the shutter 11 when the window 10 is closed.

Figure 48:
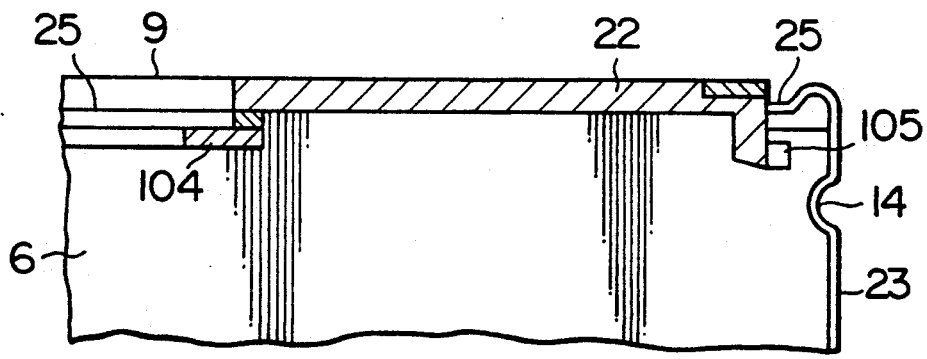

As shown in FIG. 48, the slider 22 is not brought into contact with the connecting wall 23 of the cartridge case 21 but with a projection 105 formed at an inner surface of the cartridge case 21 whereby it is possible to limit the set position of the shutter 11 when the window 10 is closed.

Figure 49:
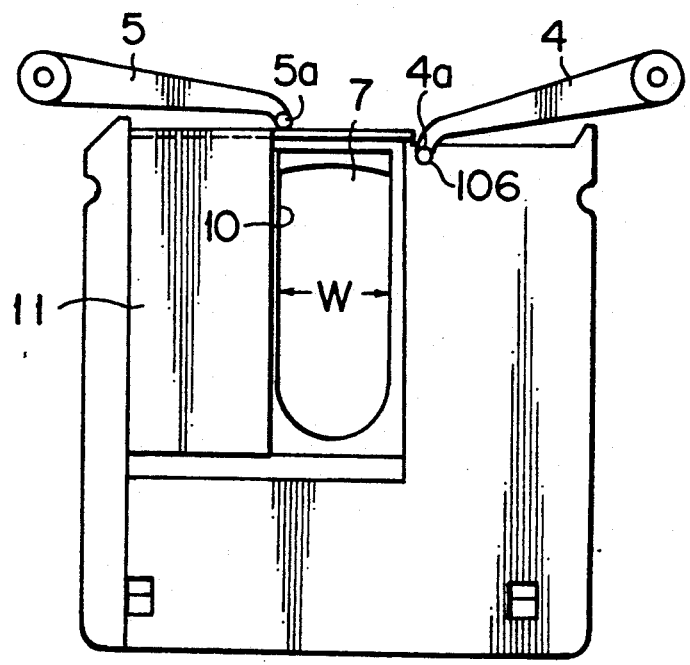
Figure 50:
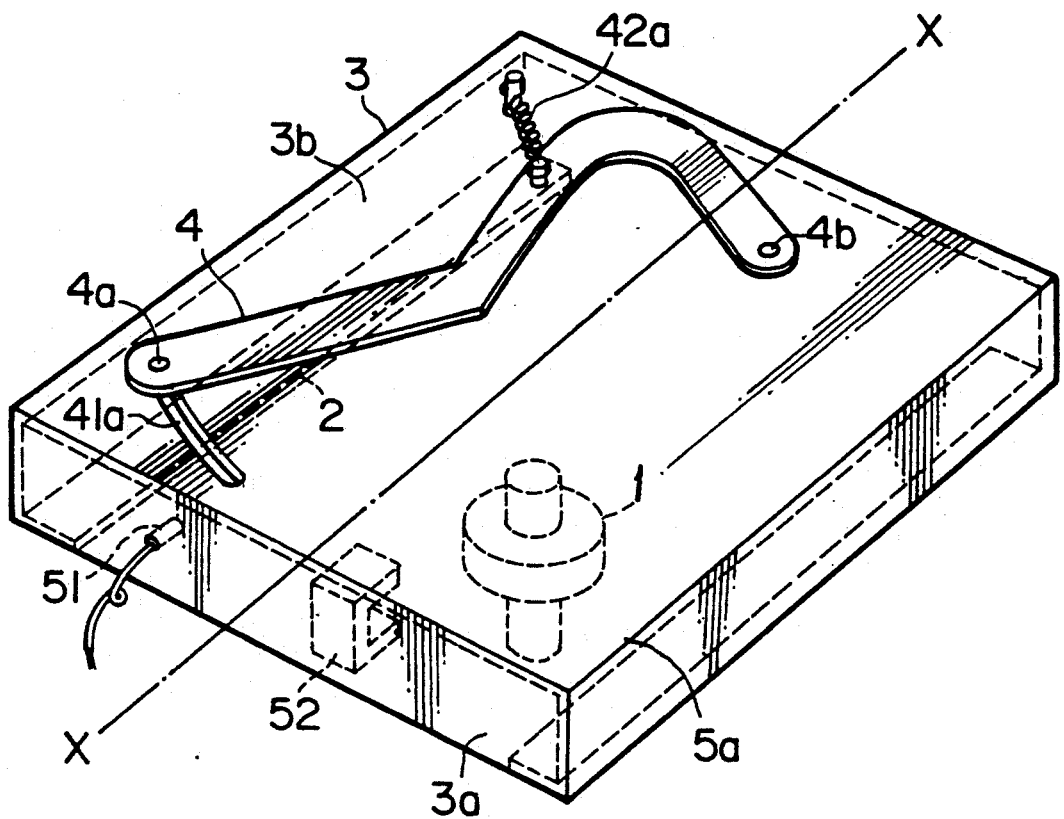

In the foregoing embodiments, the shutter 11 is held at the fully open position by the shutter holding member 52. However, as shown in FIG. 49, a pin engagement recess 106 is formed in a portion of the front edge 9 of the cartridge case 21, where the pin 4a or 5a moves when the shutter 11 is moved to the fully open position, and the pin 4a or 5a falls into the pin engagement recess 106, thereby holding the shutter 11 at the fully open position.

Figure 51:
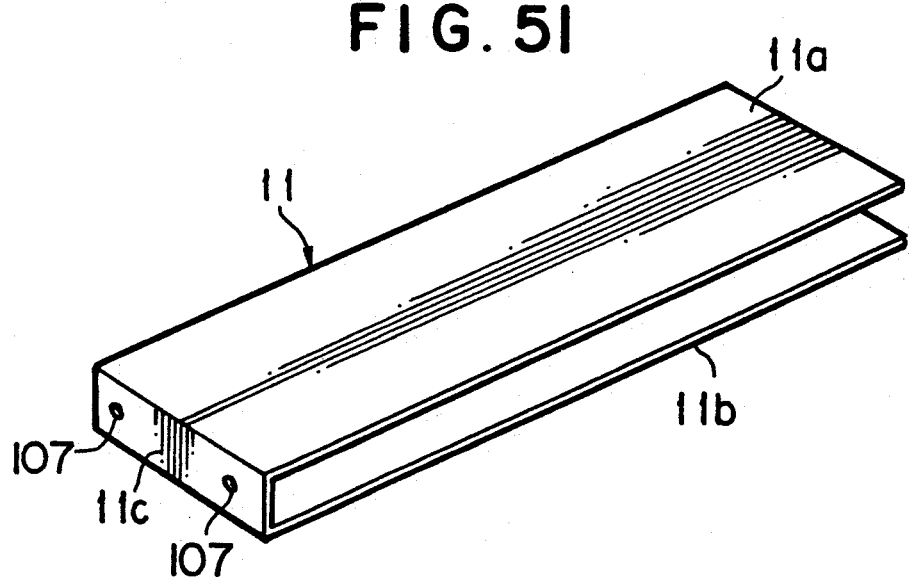

Furthermore, although in the foregoing embodiments, there are provided the two opening/closing arms 4 and 5, it is possible to open/close the shutter with a single opening/closing arm as shown in FIG. 51.

Also, although in the foregoing embodiments the retainer claw 30 is formed in the shutter 11 and the retainer claw 30 is engaged with the recess 40 formed in the shutter mounting portion 36 of the slider 22 to thereby hold the shutter 11 and the slider 22 in unison with each other, as shown in FIG. 51, it is possible to hold the shutter 11 and the slider 22 in unison by forming screw holes 107 in the front piece 11c of the shutter 11 and by threadedly engaging screws with the slider 22 through the screw holes 107.

In the foregoing embodiments, the shape, the arrangement, the rotational range and the like of the opening/closing arms 4 and 5 are set so that any part of the two opening/closing arms 4 and 5 does not overlap with the window 10 formed in the disc cartridge 6 when the disc cartridge 6 is inserted into the rearmost portion of the cartridge holder 3 and the shutter 11 provided on the disc cartridge 6 is held in the fully open condition. However, as shown in FIG. 52, it is possible to modify this arrangement so that under the fully open condition of the shutter 11, a part of the opening/closing arms 4 and 5 is overlapped with a part of the window 10. This arrangement may be applied to a disc drive apparatus for a rewrite type optical disc or a mutually change type optical disc, in which the optical head is provided only on the side opposite to the opening/closing arm side through the disc cartridge 6. In addition, if the overlapped portion between the two opening/closing arms 4 and 5 and the window 10 is limited to the insertion portion for the turntable 1, it is possible to apply the arrangement to a disc drive apparatus for a magnetooptical disc, in which the optical head and the outer magnetic field ar provided on both sides of the disc cartridge 6.

Moreover, it is apparent for those skilled in the art to suitable modify the shapes and the arrangements of the cartridge holder 3, the arms 4 and 5, pins 4a and 5a and the like within the scope of the appended claims. The present invention may be applied to the magnetic disc drive apparatus as well as the optical disc drive apparatus. Mover specifically, in the case where the invention is applied to the magnetic disc drive apparatus, the directionability of the magnetic disc cartridge may be ignored relative to the drive apparatus so that, even if the disc is inserted into the drive apparatus with either of the top and bottom to the disc being directed in a specific direction, it is possible to carry out the recording/reproduction of the informations. Accordingly, the insertion work of the magnetic disc cartridge is facilitated, and at the same time, the damage of the head and the magnetic disc due to the erroneous insertion may be prevented in advance.

As described above, in the disc drive apparatus according the present invention, since the two arms are mounted on or above the cartridge holder, it is possible to miniaturize the planar two-dimensional size of the disc drive apparatus. Also, since the two arms cross each other and the proximal ends thereof are arranged on the insertion opening side of the cartridge holder while the distal ends thereof are arranged on the rear side of the cartridge holder, it is possible to reduce the shutter drive force.

What is claimed is:

1. A disc drive apparatus including a cartridge holder for detachably holding a disc cartridge provided with a shutter slidingly moving in one direction from a closed position to open windows formed in an upper surface and a lower surface of a cartridge case and opening/closing arms rotatably mounted on the cartridge holder for moving the shutter in an opening direction by an insertion force of the disc cartridge into the cartridge holder, said cartridge holder having an open end for insertion of said disc cartridge into said cartridge holder, characterized in that a proximal end portion of a first elongated opening/closing arm for moving the shutter in the opening direction when the disc cartridge is inserted relative to said cartridge holder with a first surface thereof facing upwardly and a proximal end portion of a second elongated opening/closing arm for moving the shutter in the opening direction when the disc cartridge is inserted relative to the cartridge holder with a second surface thereof facing upwardly are rotatably mounted such that said proximal end portions are spaced apart an interval on a disc cartridge insertion opening side of a ceiling plate forming the cartridge holder, each said proximal end notion located closer to said open end of said cartridge holder, the two opening/closing arms having substantially the same length and crossing each other on a major plane of the ceiling plate with their distal end portions being disposed opposite said open end in a rearward direction of the cartridge holder, and pins provided at the distal end portions of the respective opening/closing arms for driving the shutter in the opening direction and being disposed outside of the closed position of the shutter within the cartridge holder.

2. The disc drive apparatus according to claim 1, wherein a shape, an arrangement and a rotational range of each of said opening/closing arms are selected so that any part of each of the opening/closing arms is projected within a major region of the ceiling plate of said cartridge holder during the movement of said pins from a first insertion position where said pins start to contact with a front end face of said disc cartridge to a second insertion position where the insertion of said disc cartridge has been completed.

3. The disc drive apparatus according to claim 1, wherein a shape, an arrangement and a rotational range of each of said opening/closing arms are selected so that said opening/closing arms are disposed outside of the windows formed in said cartridge case when said disc cartridge is inserted up to an insertion completion position of said cartridge holder.

4. The disc drive apparatus according to claim 1, a shape, an arrangement and a rotational range of each of said opening/closing arms are selected so that said opening/closing arms are overlapped with said windows formed in said cartridge case when said disc cartridge is inserted up to an insertion completion position of said cartridge holder.

5. The disc drive apparatus according to claim 1, wherein a head insertion hole is formed in the ceiling plate of said cartridge holder, and a shape, an arrangement and a rotational range of each of said opening/closing arms are selected so that any part of each of the opening/closing arms is disposed outside of said head insertion hole during the movement of said pins from a first insertion position where said pins engage a front end face of said disc cartridge to a second insertion position where the insertion of the disc cartridge has been completed.

6. The disc drive apparatus according to claim 1, wherein said opening/closing arms are provided on an outer surface of the ceiling plate of said cartridge holder.

7. The disc drive apparatus according to claim 1, wherein said opening/closing arms are provided on an inner surface of the ceiling plate of said cartridge holder.

8. The disc drive apparatus according to claim 1, wherein said first and second opening/closing arms are both in the form of planar plates, said first and second opening/closing arms are mounted on said ceiling plate of said cartridge holder with their height levels being different from each other, and the pins having different lengths are provided at the distal end portions of said first and second opening/closing arms, respectively.

9. The disc drive apparatus according to claim 1, wherein one of said first and second opening/closing arms is in the form of a planar plate while the other is in the form of a crank, said first and second opening/closing arms are mounted on the ceiling plate of said cartridge holder so that the distal end portions of said first and second opening/closing arms are kept at the same level in position, and the pins having the same length are provided on the distal end portions of said first and second opening/closing arms, respectively.

10. The disc drive apparatus according to claim 1, wherein said first opening/closing arm extends opposite the insertion side of said disc cartridge while bypassing a pivot shaft of said second opening/closing arm toward an insertion opening side of said disc cartridge, and said second opening/closing arm extends opposite the insertion side of said disc cartridge while bypassing a pivot shaft of said first opening/closing arm toward the insertion opening side of said disc cartridge.

11. The disc drive apparatus according to claim 10, wherein the pivot shaft of said first opening/closing arm serves as a positional stopper for regulating a rotational limit of said second opening/closing arm when said disc cartridge is inserted into said cartridge holder to thereby rotate said second opening/closing arm in the shutter opening direction, and the pivot shaft of said second opening/closing arm serves as a positional stopper for regulating a rotational limit of said first opening/closing arm when said disc cartridge is inserted into said cartridge holder to thereby rotate said first opening/closing arm in the shutter opening direction.

12. The disc drive apparatus according to any one of claims 1 to 11, wherein arm retainer members for preventing deformation and vibration of said first and second opening/closing arms are provided in said cartridge holder.

* * * * *